United States Patent
Kumar et al.

(10) Patent No.: US 12,301,444 B2
(45) Date of Patent: *May 13, 2025

(54) METHOD AND UE FOR PERFORMING RID UPDATE IN UE IN WIRELESS COMMUNICATION NETWORK

(71) Applicant: SAMSUNG ELECTRONICS CO., LTD., Suwon-si (KR)

(72) Inventors: Lalith Kumar, Bengaluru (IN); Nitesh Pushpak Shah, Bengaluru (IN); Shweta Madhurapantula, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,248

(22) Filed: Jan. 29, 2024

(65) Prior Publication Data
US 2024/0171499 A1    May 23, 2024

Related U.S. Application Data

(63) Continuation of application No. 18/160,210, filed on Jan. 26, 2023, now Pat. No. 11,929,914, which is a
(Continued)

(30) Foreign Application Priority Data

Feb. 15, 2019  (IN) .............................. 201941006133
Feb. 11, 2020  (IN) .............................. 201941006133
Feb. 13, 2020  (IN) .............................. 202042006264

(51) Int. Cl.
H04L 12/759    (2013.01)
H04L 45/00     (2022.01)
(Continued)

(52) U.S. Cl.
CPC ............ *H04L 45/14* (2013.01); *H04L 45/028* (2013.01); *H04W 8/02* (2013.01); *H04W 8/08* (2013.01);
(Continued)

(58) Field of Classification Search
CPC ........ H04L 45/14; H04L 45/028; H04W 8/08; H04W 24/04; H04W 60/005;
(Continued)

(56) References Cited

U.S. PATENT DOCUMENTS 11,452,163 B2    9/2022  Park et al.
12,082,286 B2 *  9/2024  Won ........................ H04W 76/19
(Continued)

FOREIGN PATENT DOCUMENTS

CN    101167392 A    4/2008
CN    107592974 A    1/2018
EP    3402234 A1    11/2018

OTHER PUBLICATIONS

The First Office Action dated Mar. 25, 2024, in connection with Chinese Patent Application No. 202080014470.7, 16 pages.
(Continued)

*Primary Examiner* — Hoang-Chuong Q Vu

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein provide a method for per-
(Continued)

forming a routing ID (RID) update in user equipment (UE) in a wireless communication network.

10 Claims, 14 Drawing Sheets

Related U.S. Application Data continuation of application No. 17/463,400, filed on Aug. 31, 2021, now Pat. No. 11,570,085, which is a continuation of application No. 16/792,768, filed on Feb. 17, 2020, now Pat. No. 11,134,005.

(51) Int. Cl.
| | |
|---|---|
| H04L 45/028 | (2022.01) |
| H04W 8/02 | (2009.01) |
| H04W 8/08 | (2009.01) |
| H04W 24/04 | (2009.01) |
| H04W 36/00 | (2009.01) |
| H04W 60/00 | (2009.01) |
| H04W 60/04 | (2009.01) |
| H04W 60/06 | (2009.01) |
| H04W 76/27 | (2018.01) |
| H04W 88/06 | (2009.01) |
| H04W 8/10 | (2009.01) |
| H04W 8/12 | (2009.01) |
| H04W 8/24 | (2009.01) |

(52) U.S. Cl.
CPC ....... *H04W 24/04* (2013.01); *H04W 36/0033* (2013.01); *H04W 60/005* (2013.01); *H04W 60/04* (2013.01); *H04W 60/06* (2013.01); *H04W 76/27* (2018.02); *H04W 88/06* (2013.01); *H04W 8/10* (2013.01); *H04W 8/12* (2013.01); *H04W 8/245* (2013.01)

(58) Field of Classification Search
CPC ..... H04W 60/04; H04W 60/06; H04W 76/27; H04W 88/06; H04W 76/34; H04W 76/19; H04W 8/02; H04W 40/36
See application file for complete search history.

(56) References Cited

U.S. PATENT DOCUMENTS

| | | |
|---|---|---|
| 2007/0140185 A1 | 6/2007 | Garg et al. |
| 2008/0205345 A1 | 8/2008 | Sachs et al. |
| 2009/0131053 A1 | 5/2009 | Sachs et al. |
| 2011/0044253 A1 | 2/2011 | Zisimopoulos |
| 2011/0171925 A1* | 7/2011 | Faccin ............... H04W 76/50 455/404.1 |
| 2012/0189016 A1 | 7/2012 | Bakker et al. |
| 2012/0252397 A1* | 10/2012 | Kumar ............... H04W 48/16 455/404.1 |
| 2016/0183156 A1 | 6/2016 | Chin et al. |
| 2016/0270024 A1 | 9/2016 | Nakata et al. |
| 2017/0041752 A1 | 2/2017 | Baek et al. |
| 2018/0167873 A1 | 6/2018 | Li |
| 2018/0192390 A1 | 7/2018 | Li et al. |
| 2018/0279397 A1 | 9/2018 | Faccin et al. |
| 2018/0279411 A1 | 9/2018 | Kang et al. |
| 2018/0324577 A1 | 11/2018 | Faccin et al. |
| 2018/0376445 A1 | 12/2018 | Yoon et al. |
| 2018/0376446 A1 | 12/2018 | Youn et al. |
| 2019/0007500 A1 | 1/2019 | Kim et al. |
| 2019/0021064 A1 | 1/2019 | Ryu et al. |
| 2019/0116486 A1 | 4/2019 | Kim et al. |
| 2019/0159158 A1 | 5/2019 | Kang et al. |
| 2019/0174449 A1 | 6/2019 | Shan et al. |
| 2019/0297593 A1 | 9/2019 | Niemi et al. |
| 2019/0373441 A1 | 12/2019 | Ryu et al. |
| 2019/0394711 A1 | 12/2019 | Kim |
| 2020/0008167 A1 | 1/2020 | Venkataraman et al. |
| 2020/0112892 A1 | 4/2020 | Shi et al. |
| 2020/0112906 A1 | 4/2020 | Chaponniere et al. |
| 2020/0280836 A1* | 9/2020 | Velev ............... H04W 76/16 |
| 2020/0305001 A1 | 9/2020 | Li et al. |
| 2020/0323020 A1 | 10/2020 | Liu |
| 2021/0058297 A1 | 2/2021 | D'Acunto et al. |
| 2021/0136658 A1 | 5/2021 | Rönneke et al. |
| 2021/0168751 A1 | 6/2021 | Stojanovski et al. |
| 2021/0235328 A1 | 7/2021 | Hui et al. |
| 2022/0053448 A1* | 2/2022 | Velev ............... H04W 8/183 |
| 2022/0264522 A1 | 8/2022 | Brusilovsky et al. |
| 2022/0353799 A1 | 11/2022 | Fard et al. |
| 2024/0430755 A1* | 12/2024 | Talebi Fard ...... H04W 36/0016 |

OTHER PUBLICATIONS

Nokia et al., "Dynamic Routing Indicator Update Description", C1-186091, 3GPP TSg-CT WG1 Meeting #112bis, Vilnius (Lithuania), Oct. 15-19, 2018, 6 pages.

Nokia et al., "Providing Routing ID Update during UE Registration", C1-186092, 3GPP TSG-CT WG1 Meeting #112bis, Vilnius (Lithuania), Oct. 15-19, 2018, 17 pages.

Qualcomm Inc. et al., "Procedure for UDM-triggered UE parameters update", 3GPP TSG-CT WG1 Meeting #113, Nov. 26-30, 2018, C1-188946, 17 pages.

Nokia et al., "UE configuration parameters update in the Registration Accept", Change Request, SA WG2 Meeting #130, Jan. 21-25, 2019, S2-1900567, 14 pages.

CATT, "Discussion on Routing ID update", SA WG2 Meeting #S2-129BIS, Nov. 26-30, 2018, S2-1812140, 3 pages.

Ericsson, "Completion of correction for local release", Change Request, 3GPP TSG-CT WG1 Meeting #114, Jan. 21-25, 2019, C1-190504, 47 pages.

International Search Report dated May 25, 2020 in connection with International Patent Application No. PCT/KR2020/002256, 3 pages.

"3rd Generation Partnership Project; Technical Specification Group Core Network and Terminals; Non-Access-Stratum (NAS) protocol for 5G System (5GS); Stage 3 (Release 15)", 3GPP TS 24.501 V15.2.0 (Dec. 2018), 455 pages.

Written Opinion of the International Searching Authority dated May 25, 2020 in connection with International Patent Application No. PCT/KR2020/002256, 5 pages.

Nokia et al., "UE re-registration following UE parameters update", 3GPP TSG-CT WG1 Meeting #114, Feb. 25-Mar. 1, 2019, C1-191656, 6 pages.

Samsung, "Routing ID update procedure and 3GPP/non-3GPP access handling", 3GPP TSG-CT WG1 Meeting #115, Feb. 25-Mar. 1, 2019, C1-191223, 2 pages.

European Patent Office, "Supplementary European Search Report" issued Feb. 10, 2022, in connection with European Patent Application No. 20756693.6, 10 pages.

Samsung et al., "UE re-registration following UE parameters update" 3GPP TSG-CT WG1 Meeting #115, C1-191509, Montreal (Canada), Feb 25-Mar. 1, 2019, 6 pages.

Nokia et al., "Fixes for DC secondary RAT charging report procedure" SA WG2 Meeting #130, S2-1901315 (revision of S2-90xxxx), Jan. 21-25, 2019, Kochi, India, 17 pages.

CATT, "Discussion on Routing ID update" 3GPP TSG CT WG1 Meeting #113, C1-188345, West Palm Beach (FL), USA, Nov. 26-30, 2018, 5 pages.

Qualcomm Incorporated, "Evaluation of solutions for Routing ID update" 3GPP TSG CT WG1 Meeting #112bis, C1-186239, Vilnius (Lithuania), Oct. 15-19, 2018, 5 pages.

Office Action dated Oct. 25, 2021 in connection with India Patent Application No. 201941006133, 6 pages.

Office Action dated Nov. 15, 2021 in connection with India Patent Application No. 202042006264, 5 pages.

Office Action dated Jul. 19, 2023, in connection with counterpart European Patent Application No. 20756693.6, 6 pages.

(56) References Cited

OTHER PUBLICATIONS

Office Action dated Apr. 3, 2025, in connection with European Patent Application No. 20756693.6 , 6 pages.

* cited by examiner

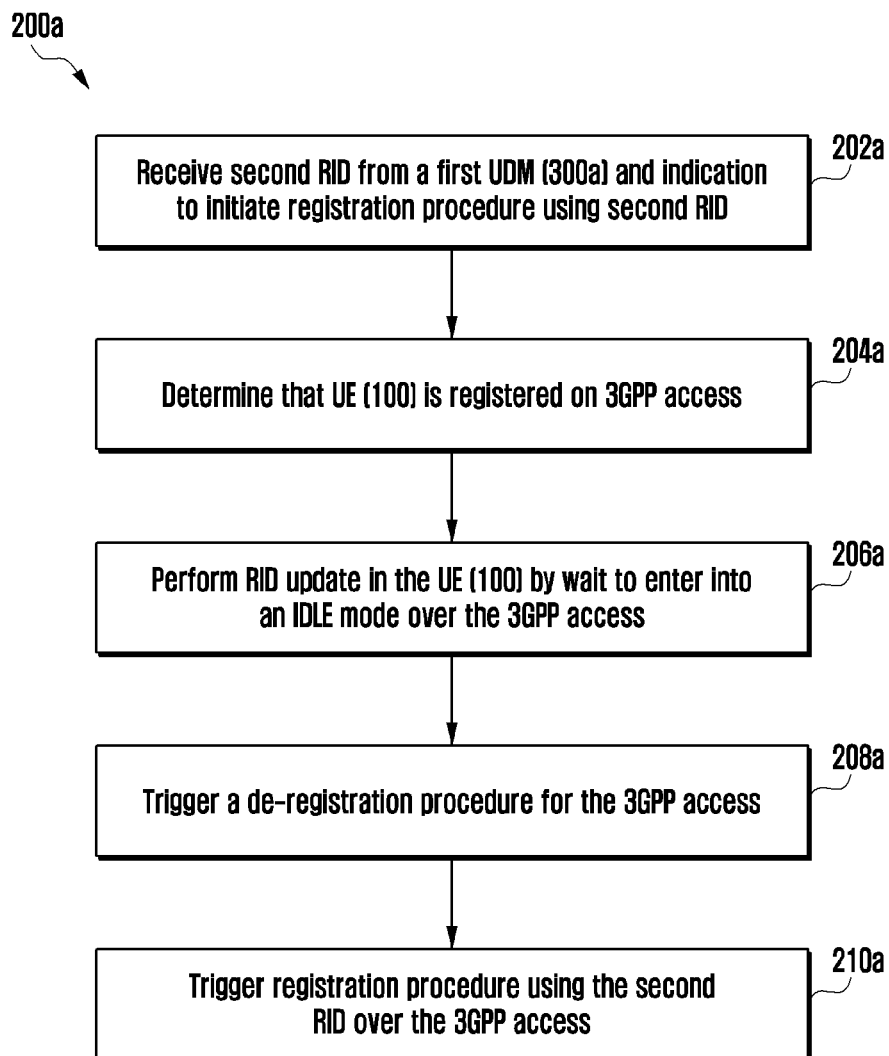

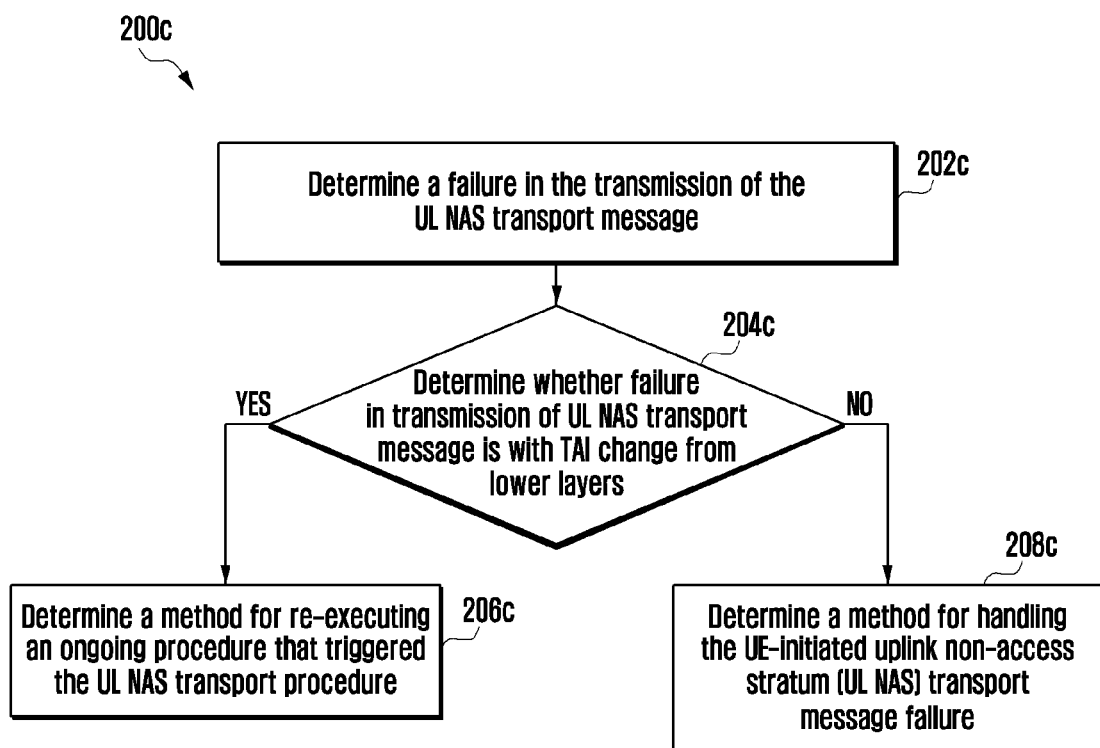

METHOD AND UE FOR PERFORMING RID UPDATE IN UE IN WIRELESS COMMUNICATION NETWORK

CROSS-REFERENCE TO RELATED APPLICATIONS

The present application is a continuation of U.S. patent application Ser. No. 18/160,210 filed on Jan. 26, 2023, which is a continuation of U.S. patent application Ser. No. 17/463,400 filed on Aug. 31, 2021, now U.S. Pat. No. 11,570,085 issued Jan. 31, 2023, which is a continuation of application Ser. No. 16/792,768 filed on Feb. 17, 2020, now U.S. Pat. No. 11,134,005 issued Sep. 28, 2021, which is based on and claims priority to Indian Provisional Patent Application No. 201941006133 filed on Feb. 15, 2019, Indian Non-Provisional Patent Application No. 201941006133 filed on Feb. 11, 2020 and Indian Non-Provisional Patent Application No. 202042006264 filed on Feb. 13, 2020 the disclosure of which is herein incorporated by reference in its entirety.

BACKGROUND

1. Field

The embodiments herein relate to wireless communication, and more particularly, to a method and user equipment (UE) for performing a routing ID (RID) update in the UE (100) in a wireless communication network.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

Accordingly, the embodiments herein provide a method for performing a routing ID (RID) update in user equipment (UE) (100) in a wireless communication network. The method includes receiving, by the UE (100), a second routing ID (RID) from a first Unified Data Management (UDM) (300a) and an indication to initiate a registration procedure using the second RID, where the UE (100) is currently configured using a first routing ID (RID) and determining, by the UE (100), that the UE (100) is registered on a 3rd Generation Partnership Project (3GPP) access. Further, the method includes performing, by the UE (100), the routing ID (RID) update in the UE (100) by: waiting to enter into an IDLE mode over the 3GPP access, triggering a de-registration procedure for the 3GPP access; and triggering a registration procedure using the second RID over the 3GPP access.

In an embodiment, the second routing ID (RID) is received in a downlink Non-Access Stratum (DL NAS) transport message from the wireless communication network.

Accordingly, the embodiments herein provide a method for performing a routing ID (RID) update in user equipment (UE) (100) in a wireless communication network. The method includes receiving, by the UE (100), a second routing ID (RID) from a first Unified Data Management (UDM) (300a) and an indication to initiate a registration procedure using the second RID, where the UE (100) is currently configured using a first routing ID (RID) and determining, by the UE (100), that the UE (100) is registered on a non-3rd Generation Partnership Project (N3GPP) access. Further, the method includes determining, by the UE (100), whether a critical service is active on the non-3GPP access; and performing, by the UE (100), the routing ID (RID) update in the UE (100) by one of: waiting for completion of the critical service over the non-3GPP access, releasing a locally Non-access stratum (NAS) signaling connection over the non-3GPP access and entering the IDLE mode, performing the de-registration procedure and triggering registration procedure using the second RID over the non-3GPP access, in response to determining that the critical service is active on the non-3GPP access. Further, releasing immediately the NAS signaling connection over the non-3GPP access and entering the IDLE mode, performing the de-registration procedure and triggering registration procedure using the second RID over the non-3GPP access, in response to determining that the critical service is not active on the non-3GPP access.

Accordingly, the embodiments herein provide user equipment (UE) (100) for managing access during a routing ID (RID) update in a wireless communication network. The UE (100) includes a memory (140) and a processor (160) coupled to the memory (140). The processor (160) is configured to receive a second routing ID (RID) from a first Unified Data Management (UDM) (300*a*) and an indication to initiate a registration procedure using the second RID, where the UE (100) is currently configured using a first routing ID (RID) and determine that the UE (100) is registered on a 3rd Generation Partnership Project (3GPP) access. Further, the processor (160) is also configured to perform the routing ID (RID) update in the UE (100) by wait to enter into an IDLE mode over the 3GPP access, trigger a de-registration procedure for the 3GPP access; and trigger a registration procedure using the second RID over the 3GPP access.

Accordingly, the embodiments herein provide user equipment (UE) (100) for managing access during a routing ID (RID) update in a wireless communication network. The UE (100) includes a memory (140) and a processor (160) coupled to the memory (140). The processor (160) is configured to receive a second routing ID (RID) from a first Unified Data Management (UDM) (300*a*) and an indication to initiate a registration procedure using the second RID, where the UE (100) is currently configured using a first routing ID (RID). Further, the processor (160) is also configured to determine that the UE (100) is registered on a non-3rd Generation Partnership Project (N3GPP) access and determine whether a critical service is active on the non-3GPP access. Furthermore, the processor (160) is also configured to perform the routing ID (RID) update in the UE (100) by one of: wait for completion of the critical service over the non-3GPP access, releasing a locally Non-access stratum (NAS) signaling connection over the non-3GPP access and entering the IDLE mode, performing the de-registration procedure and triggering registration procedure using the second RID over the non-3GPP access, in response to determining that the critical service is active on the non-3GPP access, and release immediately the NAS signaling connection over the non-3GPP access and entering the IDLE mode, performing the de-registration procedure and triggering registration procedure using the second RID over the non-3GPP access, in response to determining that the critical service is not active on the non-3GPP access.

Accordingly, the embodiments herein provide a method for handling a UE (100)-initiated uplink non-access stratum (UL NAS) transport message failure in a wireless communication network. The method includes determining, by the UE (100), a failure in the transmission of the UL NAS transport message and determining, by the UE (100), whether the failure in the transmission of the UL NAS transport message is with a TAI change from lower layers. Further, the method includes performing, by the UE (100), one of determining, by the UE (100), a method for re-executing an ongoing procedure that triggered the UL NAS transport procedure, in response to determining that the failure in the transmission of the UL NAS transport message is with the TAI change from the lower layers, and determining, by the UE (100), a method for handling the UE (100)-initiated uplink non-access stratum (UL NAS) transport message failure, in response to determining that the failure in the transmission of the UL NAS transport message is without the TAI change from the lower layers.

Accordingly, the embodiments herein provide user equipment (UE) (100) for handling a UE (100)-initiated uplink non-access stratum (UL NAS) transport message failure in a wireless communication network. The UE (100) includes a memory (140) and a processor (160) coupled to the memory (140). The processor (160) is configured to determine a failure in the transmission of the UL NAS transport message and determine whether the failure in the transmission of the UL NAS transport message is with a TAI change from lower layers. Further, the processor (160) is configured to perform one of: determine a method for re-executing an ongoing procedure that triggered the UL NAS transport procedure, in response to determining that the failure in the transmission of the UL NAS transport message is with the TAI change from the lower layers, and determine a method for handling the UE (100)-initiated uplink non-access stratum (UL NAS) transport message failure, in response to determining that the failure in the transmission of the UL NAS transport message is without the TAI change from the lower layers.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2A illustrates a flow chart 200a of a method for performing the RID update over a 3GPP access in the UE (100) in the wireless communication network, according to an embodiment as disclosed herein;

FIG. 2C illustrates a flow chart 200b of a method for handling a UE-initiated uplink non-access stratum (UL NAS) transport message failure in the wireless communication network, according to an embodiment as disclosed herein;

DETAILED DESCRIPTION

Figure 1:
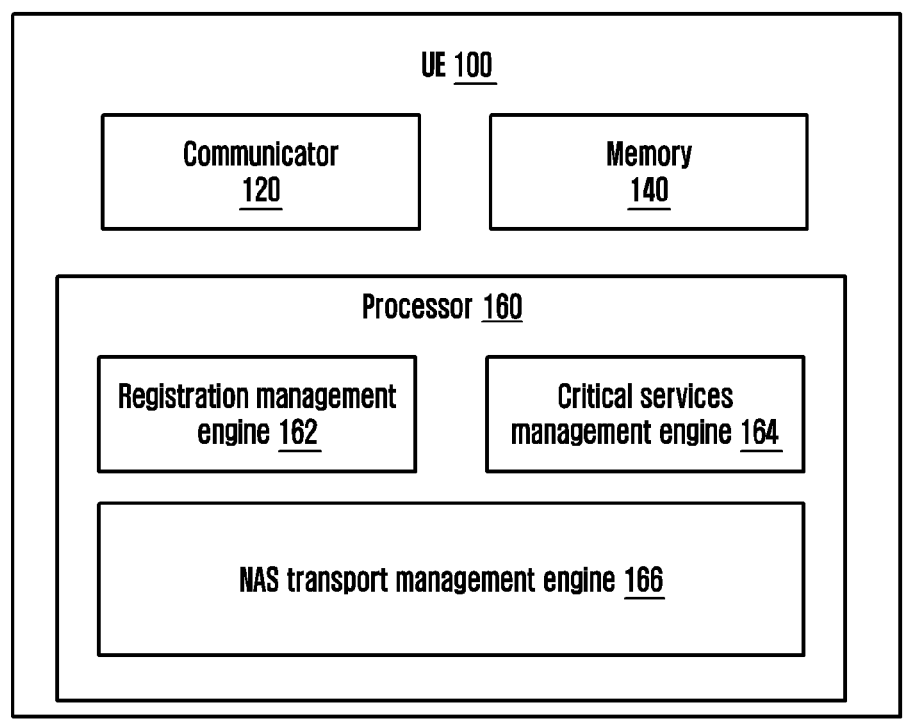
FIG. 1 illustrates a block diagram of user equipment (UE) (100) for performing a routing ID (RID) update in the UE (100) in a wireless communication network, according to an embodiment as disclosed herein.

FIGS. 1 through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Generally, there are two types of Non-Access Stratum (NAS) transport procedures defined in 3GPP 5G NAS specs (24.501) for transporting message payload and associated information between user equipment (UE) and a wireless communication network. The two types of the NAS transport procedures include a UE-initiated NAS Transport (UL NAS Transport) procedure and a Network-initiated NAS Transport (DL NAS Transport) procedure. The two types of the NAS transport procedures are independent procedures.

Conventional 3GPP agreements assume that the UE-initiated NAS Transport procedure is re-tried by upper layers (above NAS) in cases like SMS, etc. However, there are various scenarios like the UE receiving a steering of roaming (SOR) information with acknowledgement requested, a UE Parameters Update via a Unified Data Management (UDM) Control plane (for parameters such as Routing ID, Slice information, etc.) with acknowledgement requested, etc. where retries might not be attempted in case the procedure fails. The failure of the UE-initiated NAS Transport procedure causes a mismatch in the configurations between the UE and the wireless communication network or cause synchronization issue between the UE and the wireless communication network, leading to abnormal behaviors of both the UE and wireless communication network which needs to be resolved.

The above information is presented as background information only to help the reader to understand the present disclosure. Applicants have made no determination and make no assertion as to whether any of the above might be applicable as prior art with regard to the present application.

The object of the embodiments herein is to provide a method for performing a routing ID (RID) update in the UE (100) in a wireless communication network.

Another object of the embodiments herein is to receive a downlink Non-Access Stratum (DL NAS) transport message comprising a second RID from a first Unified Data Management (UDM).

Another object of the embodiments herein is to perform the routing ID (RID) update in the UE (100) by waiting to enter into an IDLE mode over the 3GPP access and triggering a de-registration procedure for the 3GPP access followed by triggering a registration procedure using the second RID over the 3GPP access.

Another object of the embodiments herein is to determine that a critical service is active on the non-3GPP access and perform the routing ID (RID) update in the UE (100) by waiting for completion of the critical service over the non-3GPP access locally release the N1 NAS signaling connection and enter 5GMM-IDLE mode over non-3GPP access, perform a de-registration procedure, and then initiate a registration procedure for initial registration with new assigned SUCI.

Another object of the embodiments herein is to provide a method for handling UE initiated UL NAS transport message failure in wireless communication network.

Another object of the embodiments herein is to provide a method for managing access during a routing ID update by user equipment (UE) in a wireless communication network.

Another object of the embodiments herein is to receive a downlink Non-Access Stratum (DL NAS) transport message comprising the RID over a 3GPP access from a first Unified Data Management (UDM).

Another object of the embodiments herein is to that the UE is registered on both the 3GPP access and a non-3GPP access.

Another object of the embodiments herein is to wait to enable an IDLE mode over the 3GPP access.

Another object of the embodiments herein is to de-register from the first UDM over the 3GPP access and register to a second UDM over the 3GPP access.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The proposed method is applicable in both accesses, i.e., RID change over a 3GPP access then a N3GPP access has to be updated or RID change over the N3GPP access then the 3GPP access has to be updated.

The proposed method is applicable even in an INACTIVE state i.e., wherever an IDLE state is specified, can be replaced with the INACTIVE state.

Accordingly, the embodiments herein provide a method for performing a routing ID (RID) update in user equipment (UE) (100) in a wireless communication network. The method includes receiving, by the UE (100), a second routing ID (RID) from a first Unified Data Management (UDM) (300*a*) and an indication to initiate a registration procedure using the second RID, where the UE (100) is currently configured using a first routing ID (RID) and determining, by the UE (100), that the UE (100) is registered on a 3rd Generation Partnership Project (3GPP) access. Further, the method includes performing, by the UE (100), the routing ID (RID) update in the UE (100) by: waiting to enter into an IDLE mode over the 3GPP access i.e. the UE (100) will move to the IDLE mode only after receiving a RRC connection release from the wireless communication network, triggering a de-registration procedure for the 3GPP access; and triggering a registration procedure using the second RID over the 3GPP access. Further, in order to use the second RID a new Subscription Concealed Identifier (SUCI) has to be used which implies that the UE (100) will delete a 5G-GUTI and initiate a registration procedure for the initial registration. The term waiting to enter into the IDLE mode over the 3GPP access implies the UE (100) waits for the wireless communication network to indicate to the UE (100) with a message to get into the IDLE mode, to handle possible abnormal cases, the UE (100) can wait for the wireless communication network to indicate to the UE (100) to move to the IDLE mode till a pre-determined time (may be using a timer) after which the UE (100) can move locally into the IDLE mode.

In general, when the UL NAS TRANSPORT message transmission failure occurs it is the responsibility of the upper layers to retransmit the message so that UL NAS TRANSPORT message (i.e., the procedure) can be reattempted. For example, session management layer can send session management message which will be encapsulated in the UL NAS TRANSPORT message at 5GMM layer and attempted to be transmitted. If UL NAS TRANSPORT message is not transmitted successfully then session management layer is expected to retransmit the message. Thus, it can be guaranteed that information which needs to be communicated to the network is not lost. However, there are some information's which are sent from the network to the UE in NAS message like DL NAS TRANSPORT which carries information which is required to be consumed by protocol layer and retry from upper layers is not expected for example Steering of Roaming (SOR) information, UE parameters update data etc. For such information, it should be the responsibility of the NAS layer to attempt the retries appropriately. The other important problem is while the UE is attempting to send UL NAS TRANSPORT message the UE may end up initiating some other procedure for example while UL NAS TRANSPORT message is transmitted the TAI could change and this can lead for the UE to initiate the registration procedure, the state machine in the UE does not remember that some other procedure was ongoing and the UE will lose this information. i.e., the information which is expected to be sent to the network via UL NAS TRANSPORT message is lost and can lead for failure of those respective procedures. To handle this issue, the UE could determine a method for handling the UE-initiated uplink non-access stratum (UL NAS) transport message failure on determining that the failure in the transmission of the UL NAS transport message is with the TAI change from the lower layers. To determine the method for handling the UE-initiated UL NAS transport message failure, the UE determines whether a current TAI is in a TAI list sent by the wireless communication network and performs one of: abort the transmission of the UL NAS transport message by the UE (100), remember (i.e. identify) that transmission failure occurred for UL NAS TRANSPORT message and initiating a procedure for mobility and a periodic registration update, in response to determining that the current TAI is not in the TAI list sent by the wireless communication network, and identify that the UL NAS transport message is not been transmitted successfully, initiate a registration procedure, re-attempt to send the UL NAS TRANSPORT message based on an identification that the UL NAS transport message is not been transmitted successfully after completion of the registration procedure, in response to determining that the current TAI is not in the TAI list sent by the wireless communication network. Further, the UE can determine a method for re-executing an ongoing UL NAS Transport procedure that triggered the UL NAS transport procedure on determining that the failure in the transmission of the UL NAS transport message is without the TAI change from the lower layers.

Referring now to the drawings, and more particularly to FIGS. 1 through 7B, where similar reference characters denote corresponding features consistently throughout the figures, there are shown preferred embodiments and prior arts for comparison with the preferred embodiments.

FIG. 1 illustrates a block diagram of user equipment (UE) (100) for performing or managing access during a routing ID (RID) update in the UE (100) in a wireless communication network, according to an embodiment as disclosed herein.

Referring to FIG. 1, the UE (100) can be, for example, a mobile phone, a smart phone, Personal Digital Assistant (PDA), a tablet, a wearable device, or the like. In an embodiment, the UE (100) can include a communicator (120), a memory (140) and a processor (160).

In an embodiment, the communicator (120) is configured to receive a downlink Non-Access Stratum (DL NAS) transport message. The DL NAS includes a second routing ID over a 3rd Generation Partnership Project (3GPP) access from a first UDM (300a). The UE (100) is currently configured using a first routing ID (RID). The second routing ID indicates the UE (100) to initiate a registration with a second UDM (300b). The term routing ID (RID) can be used interchangeably with Routing indicator which is defined as: an identifier assigned by the UE's home network operator to be used together with a Home Network Identifier for routing network signaling. Routing Indicator is provisioned in the universal subscriber identity module (USIM) of the UE (100).

In another embodiment, the communicator (120) is configured to receive a de-registration request message from one of: at least one upper layer above the NAS layer and the wireless communication network. Further, the communicator (120) is also configured to receive a L2 ACK for successful transmission of a UL NAS transport message during a UL NAS transport procedure.

In an embodiment, the memory (140) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (140) may, in some examples, be considered a non-transitory storage medium. The term "non-transitory" may indicate that the storage medium is not embodied in a carrier wave or a propagated signal. However, the term "non-transitory" should not be interpreted that the memory (140) is non-movable. In some examples, the memory (140) is configured to store larger amounts of information than the memory. In certain examples, a non-transitory storage medium may store data that can, over time, change (e.g., in Random Access Memory (RAM) or cache).

In an embodiment, the processor (160) includes a registration management engine (162), a critical services management engine (164) and a non-access stratum (NAS) transport management engine (166).

The registration management engine (162) is configured to receive the DL NAS transport message comprising the second RID from the communicator (120). Further, the registration management engine (162) is configured to determine that the UE (100) is registered on the 3GPP access and wait for entering an IDLE mode over the 3GPP access. Further, on determining that the IDLE mode is entered, the registration management engine (162) is configured to trigger a de-registration procedure for the 3GPP access and trigger a registration procedure using the second RID over the 3GPP access. The term IDLE mode corresponds to either 5GMM-IDLE mode or 5GMM-CONNECTED mode with RRC inactive indication, i.e., there is no active radio resource allocated to the UE (100). The deregistration procedure in the specification can be using single message per access or for both the accesses together.

In another embodiment, in response to receiving an indication from the critical services management engine (164) that the critical service over the non-3GPP access is active and has been completed, the registration management engine (162) is configured to release locally non-access stratum (NAS) signaling connection over the non-3GPP access. Further, the registration management engine (162) is configured to enter the IDLE mode, perform the de-registration procedure and trigger the registration procedure using the second RID over the non-3GPP access.

In response to receiving the indication from the critical services management engine (164) that the critical service over the non-3GPP access is not active, the registration management engine (162) is configured to release immediately the NAS signaling connection over the non-3GPP access and enter the IDLE mode. Further, the registration management engine (162) is configured to perform the de-registration procedure and trigger the registration procedure using the second RID over the non-3GPP access.

In another embodiment, the registration management engine (162) is configured to process the de-registration request received from one of: the at least one upper layer above the NAS layer and the wireless communication network.

The critical services management engine (164) is configured to determine whether a critical service is active on the non-3GPP access. Further, in response to determining that the critical service is active on the non-3GPP access, the critical services management engine (164) is configured to wait for the completion of the critical service over the non-3GPP access and indicate the completion of the critical service over the non-3GPP access to the registration management engine (162).

Further, in response to determining that the critical service is inactive on the non-3GPP access, the critical services management engine (164) is configured to indicate to the registration management engine (162) that the critical service is inactive on the non-3GPP access.

In an embodiment, the NAS transport management engine (166) is configured to determine a failure in the transmission of an uplink non-access stratum (UL NAS) transport message and determine whether the failure in the transmission of the UL NAS transport message is with a TAI change from lower layers.

Further, the NAS transport management engine (166) is configured to determine a method for handling the UE-initiated uplink non-access stratum (UL NAS) transport message failure on determining that the failure in the transmission of the UL NAS transport message is without the TAI change from the lower layers. To determine the method for handling the UE-initiated UL NAS transport message failure, the NAS transport management engine (166) determines whether a current TAI is in a TAI list sent by the wireless communication network and performs one of: abort the transmission of the UL NAS transport message by the UE (100) and initiating a procedure for mobility and a periodic registration update, in response to determining that the current TAI is not in the TAI list sent by the wireless communication network, and identify that the UL NAS transport message is not been transmitted successfully, initiate a registration procedure, re-attempt to send the UL NAS TRANSPORT message based on an identification that the UL NAS transport message is not been transmitted successfully after completion of the registration procedure, in response to determining that the current TAI is not in the TAI list sent by the wireless communication network. Further, the NAS transport management engine (166) is also configured to determine a method for re-executing an ongoing procedure that triggered the UL NAS transport procedure on determining that the failure in the transmission of the UL NAS transport message is with the TAI change from the lower layers.

In another embodiment, the processor (160) is configured to receive the second routing ID (RID) from the first Unified Data Management (UDM) (300a) and the indication to initiate the registration procedure using the second RID and determine that the UE (100) is registered on the non-3GPP access and does not have any emergency services (or critical service) ongoing over the non-3GPP access. Further, the processor (160) is configured to locally release the N1 NAS signaling connection and enter a 5GMM-IDLE mode over the non-3GPP access, perform the de-registration procedure, delete a 5G-GUTI if the UE (100) is registered to a different PLMN on the 3GPP access or the UE (100) is not registered over the 3GPP access, and then initiate a registration procedure for initial registration.

In another embodiment, when the DL NAS TRANSPORT message is received with the second routing ID and if the critical service is ongoing on either 3GPP access or non-3GPP access the UE (100) will not execute the second routing ID update procedure and waits for the UE (100) to complete the critical service. On completion of the critical service, the UE (100) triggers the proposed method.

In another embodiment, the UE (100) performs deregistration procedure for both the access together (if the UE is registered on both the access over the same PLMN) and the initial registration procedure on each of the access using the second routing ID i.e. delete the currently assigned GUTI, re-calculate the SUCI using the second routing ID and use it during initial registration procedure. In another embodiment, the processor (160) is configured to receive the second routing ID (RID) from the first Unified Data Management (UDM) (300a) and the indication to initiate the registration procedure using the second RID and determine that the UE (100) is registered over the non-3GPP access and has the emergency services (or critical service) ongoing over the non-3GPP access. Further, the processor (160) is configured to wait until the emergency services are completed before locally releasing the N1 NAS signaling connection and enter the 5GMM-IDLE mode over the non-3GPP access, perform the de-registration procedure, delete the 5G-GUTI if the UE (100) is registered to different PLMN on 3GPP access or if the UE (100) is not registered over 3GPP access, and then initiate the registration procedure for the initial registration.

In another embodiment, the UE (100) which is connected over both the 3GPP access and the N3GPP access, and the RID update with registration requested is received over one access. Conventionally defined behavior for the UE (100) is to perform the deregistration followed by the registration over the access on which the message is received. The behavior is not defined for the alternate access leading to a mismatch of the UE (100) context for the 3GPP and the N3GPP at the wireless network (Ex. 2 UDMs maintaining the UE context for one access each) especially when the UE (100) is connected to a single Access and Mobility Management Function (AMF) (holds single pointer to UDM/AUSF instances) over both accesses. The proposed solution handles the above scenario of both sending the acknowledgment as well as achieving synchronization between the two accesses.

In another embodiment, the UE (100) receives new RID over the 3GPP access with acknowledgement requested and REG bit set. Conventionally the UE (100) sends the acknowledgement using the UL NAS transport message and upon entering the IDLE mode, follows the defined procedure of performing de-registration followed by the registration (over the access where DL NAS transport message is received).

Further, the a mismatch in configuration between the UE (100) (3GPP, N3GPP) and the wireless communication network due to the RID update can also be resolved as: the UE (100) performs deregistration for both the 3GPP and the N3GPP access after entering into a 3GPP IDLE mode and when there is no data activity in the N3GPP (though N3GPPA is not in IDLE mode).

In another embodiment, the UE (100) performs the deregistration from both the 3GPP access and the N3GPP access after both the 3GPP access and the N3GPP access enter the IDLE mode so that no data activity is interrupted.

In yet another embodiment, the UE (100) continues with a defined procedure over the 3GPP access and determines when the UE (100) enters the IDLE mode over the N3GPP access. In response to determining that the UE (100) has entered the IDLE mode over the N3GPP access, the UE (100) triggers the deregistration procedure over the N3GPP access with a new GUTI received during the registration procedure over the 3GPP access and then perform the initial registration procedure.

In yet another embodiment, the UE (100) performs the deregistration followed by the registration for both the 3GPP access and the N3GPP access after entering the 3GPP IDLE mode irrespective of the N3GPP access state.

In yet another embodiment, the UE (100) aborts the NAS signaling connection on both the 3GPP access and the N3GPP access immediately or at least on one of the 3GPP access or the N3GPP access when the alternate access enters the IDLE state, performs the deregistration followed by the registration for both the 3GPP access, the N3GPP access. i.e., decide to abort one or both accesses N1 signaling connection to get into the IDLE mode and initiate the initial registration procedure or wait for a specific important ongoing service to complete then abort one or both the 3GPP access and the N3GPP access N1 signaling connection to get into the IDLE mode before initiating initial registration procedure.

Although FIG. 1 shows the hardware elements of the UE (100) but it is to be understood that other embodiments are not limited thereon. In other embodiments, the UE (100) may include less or a greater number of elements. Further, the labels or names of the elements are used only for illustrative purpose and does not limit the scope of the disclosure. One or more components can be combined together to perform same or substantially similar function.

FIG. 2A illustrates a flow chart 200a of a method for performing or managing access during the RID updates in the UE (100) in the wireless communication network, according to an embodiment as disclosed herein.

Referring to FIG. 2A, at step 202a, the UE (100) receives the second RID from the first UDM (300a) and the indication to initiate the registration procedure using the second RID. For example, in the UE (100) as illustrated in FIG. 1, the communicator (120) can be configured to receive the second RID from the first UDM (300a) and the indication to initiate the registration procedure using the second RID.

At step 204a, the UE (100) determines that the UE (100) is registered on the 3GPP access. For example, in the UE (100) as illustrated in FIG. 1, the processor (160) can be configured to determine that the UE (100) is registered on the 3GPP access.

At step 206a, the UE (100) performs the RID update in the UE (100) by waiting to enter into the IDLE mode over the 3GPP access. For example, in the UE (100) as illustrated in FIG. 1, the processor (160) can be configured to perform the RID update in the UE (100) by waiting to enter into the IDLE mode over the 3GPP access.

At step 208a, the UE (100) triggers the de-registration procedure for the 3GPP access. For example, in the UE (100) as illustrated in FIG. 1, the processor (160) can be configured to trigger the de-registration procedure for the 3GPP access.

At step 210a, the UE (100) triggers the registration procedure using the second RID over the 3GPP access. For example, in the UE (100) as illustrated in FIG. 1, the processor (160) can be configured to trigger the registration procedure using the second RID over the 3GPP access.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 2B:
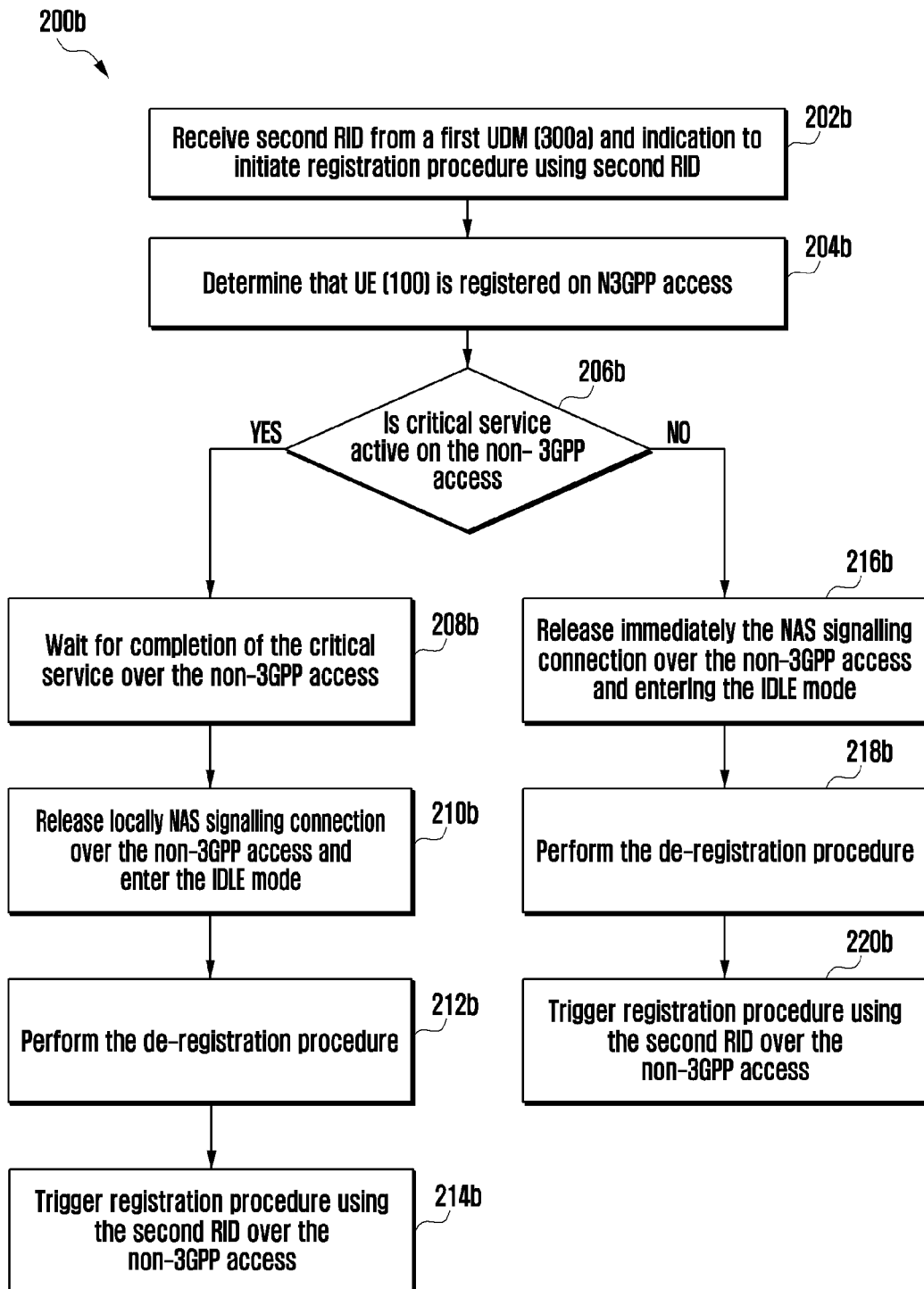
FIG. 2B illustrates a flow chart 200b of a method for performing the RID update over a N3GPP access in the UE (100) in the wireless communication network, according to an embodiment as disclosed herein.

FIG. 2B illustrates a flow chart 200b illustrating a method for performing the RID update over the N3GPP access in the UE (100) in the wireless communication network, according to an embodiment as disclosed herein.

Referring to FIG. 2B, at step 202b, the UE (100) receives the second RID from the first UDM (300a) and the indication to initiate the registration procedure using the second RID. For example, in the UE (100) as illustrated in FIG. 1, the communicator (120) can be configured to receive the second RID from the first UDM (300a) and the indication to initiate the registration procedure using the second RID.

At step 204b, the UE (100) determines that the UE (100) is registered on the N3GPP access. For example, in the UE (100) as illustrated in FIG. 1, the processor (160) can be configured to determine that the UE (100) is registered on the N3GPP access.

At step 206b, the UE (100) determines whether the critical service is active on the non-3GPP access. For example, in the UE (100) as illustrated in FIG. 1, the processor (160) can be configured to determine whether the critical service is active on the non-3GPP access.

In response to determining that the critical service is active on the non-3GPP access, at step 208b, the UE (100) waits for completion of the critical service over the non-3GPP access. For example, in the UE (100) as illustrated in FIG. 1, the processor (160) can be configured to wait for completion of the critical service over the non-3GPP access.

At step 210b, the UE (100) releases locally the NAS signaling connection over the non-3GPP access and enters the IDLE mode. For example, in the UE (100) as illustrated in FIG. 1, the processor (160) can be configured to release locally the NAS signaling connection over the non-3GPP access and enters the IDLE mode.

At step 212b, the UE (100) performs the de-registration procedure. For example, in the UE (100) as illustrated in FIG. 1, the processor (160) can be configured to perform the de-registration procedure.

At step 214b, the UE (100) triggers the registration procedure using the second RID over the non-3GPP access. For example, in the UE (100) as illustrated in FIG. 1, the processor (160) can be configured to trigger the registration procedure using the second RID over the non-3GPP access.

In response to determining that the critical service is active on the non-3GPP access, at step 216b, the UE (100) releases immediately the NAS signaling connection over the non-3GPP access and enters the IDLE mode. For example, in the UE (100) as illustrated in FIG. 1, the processor (160) can be configured to release immediately the NAS signaling connection over the non-3GPP access and enters the IDLE mode.

At step 218b, the UE (100) performs the de-registration procedure. For example, in the UE (100) as illustrated in FIG. 1, the processor (160) can be configured to perform the de-registration procedure.

At step 220b, the UE (100) triggers the registration procedure using the second RID over the non-3GPP access. For example, in the UE (100) as illustrated in FIG. 1, the processor (160) can be configured to trigger the registration procedure using the second RID over the non-3GPP access.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

FIG. 2C illustrates a flow chart 200b illustrating a method for handling a UE-initiated uplink non-access stratum (UL NAS) transport message failure in the wireless communication network, according to an embodiment as disclosed herein.

Referring to FIG. 2C, at step 202*c*, the UE (100) determines the failure in the transmission of the UL NAS transport message. For example, in the UE (100) as illustrated in FIG. 1, the processor (160) can be configured to determine the failure in the transmission of UL NAS transport message.

At step 204*c*, the UE (100) determines whether the failure in transmission of the UL NAS transport message is with the TAI change from the lower layers. For example, in the UE (100) as illustrated in FIG. 1, the processor (160) can be configured to determine whether the failure in transmission of the UL NAS transport message is with the TAI change from the lower layers.

At step 206*c*, the UE (100) determines the method for re-executing the ongoing procedure that triggered the UL NAS transport procedure, in response to determining that the failure in transmission of the UL NAS transport message is with the TAI change from the lower layers. For example, in the UE (100) as illustrated in FIG. 1, the processor (160) can be configured to determine the method for re-executing the ongoing procedure that triggered the UL NAS transport procedure, in response to determining that the failure in transmission of the UL NAS transport message is with the TAI change from the lower layers.

At step 208*c*, the UE (100) determines the method for handling the UE-initiated uplink non-access stratum (UL NAS) transport message failure, in response to determining that the failure in transmission of the UL NAS transport message is not with the TAI change from the lower layers. For example, in the UE (100) as illustrated in FIG. 1, the processor (160) can be configured to determine the method for handling the UE-initiated uplink non-access stratum (UL NAS) transport message failure, in response to determining that the failure in transmission of the UL NAS transport message is not with the TAI change from the lower layers.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 3A:
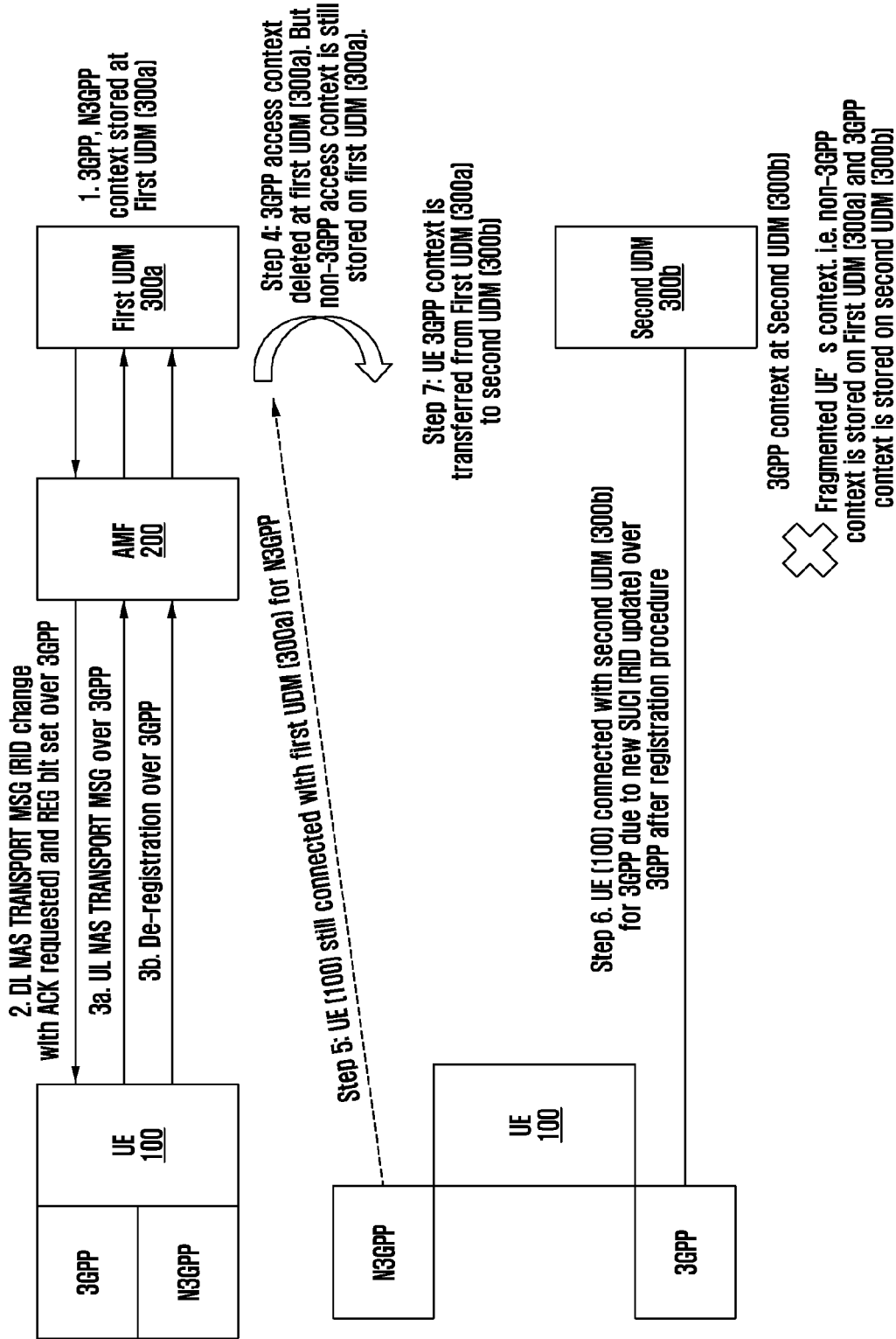
FIG. 3A illustrates a scenario of the routing ID update to switch from a first UDM (300a) to a second UDM (300b) by the UE (100) in the wireless communication network, according to prior art.

FIG. 3A illustrates a scenario of the routing ID update to switch from the first UDM (300*a*) to the second UDM (300*b*) by the UE (100) in the wireless communication network, according to prior art.

Generally, in the 5G systems the unified data management (UDM) entity maintains the context of the UE (100) which includes information such as the UE (100) is registered to an Access and Mobility Management Function (AMF) (200), the UE (100) received the data packets from a Session Management Function (SMF) and the like. Since the 5GS supports the UE (100) to be registered over both the 3GPP access and the N3GPP access, and the UDM entity stores the contexts of the UE with respect to both the 3GPP access and the N3GPP access.

Referring to FIG. 3A, at step 1, consider that the UE (100) is latched to the first UDM (300*a*) and the UE context associated with both the 3GPP access and the N3GPP access is stored at the first UDM (300*a*).

At step 2, the first UDM (300*a*) shares the RID update to the UE (100) by sending the DL NAS transport message which includes the second RID with ACK requested and a REG bit set over the 3GPP access. The second RID is a pointer to the second UDM (300*b*) to which the 5GS wants the UE (100) to latch.

At step 3*a*, the UE (100), in response to receiving the DL NAS transport message from the first UDM (300*a*), sends the UL NAS transport message over the 3GPP access to the first UDM (300*a*) to trigger the UL NAS transport procedure which may be aborted or failed and at step 3*b*, the UE (100) de-registers from the first UDM (300*a*) over the 3GPP access alone. Since, the UE (100) is de-registered over the 3GPPa access only, at step 4, the UE context associated with the 3GPP access is deleted at the first UDM (300*a*).

At step 5, the UE (100) is still connected with the first UDM (300*a*) over the N3GPP access and the UE context associated with the N3GPP access is stored at the first UDM (300*a*). At step 6, the UE (100) registers to the second UDM (300*b*) and is connected to the second UDM (300*b*) for the 3GPP access due to a new SUCI (RID update) over the 3GPP after the registration procedure.

At step 7, the UE context associated with the 3GPP access is transferred from the first UDM (300*a*) to the second UDM (300*b*). Therefore, the second UDM (300*b*) stores the UE context associated with the 3GPP access.

When the first UDM (300*a*) shares the second RID of the second UDM (300*b*), the expectation is that the UE context associated with both the 3GPP access and the N3GPP access is also transferred from the first UDM (300*a*) to the second UDM (300*b*).

The conventional, RID update procedure does not take into account an on-going service at the UE (100). The first UDM (300*a*) has no idea about which services the UE (100) is currently executing when the first UDM (300*a*) initiates the RID update procedure. Further, the RID update procedure does not take into account the current registration status of the UE (100) i.e., whether the UE (100) is registered on both the 3GPP access and the non-3GPP access or only one access is registered etc. Therefore, the conventional RID update procedure leads to the fragmented UE context being stored across multiple UDMs i.e., the UE context associated with the 3GPP access is stored at the second UDM (300*b*) and the UE context associated with the N3GPP access is stored at the first UDM (300*a*). The fragmented UE context can cause mismatch in the configurations between the UE (100) and the 5GS or sync issue between the UE (100) and the 5GS, leading to abnormal behaviors of both the UE (100) and the 5GS.

Figure 3B:
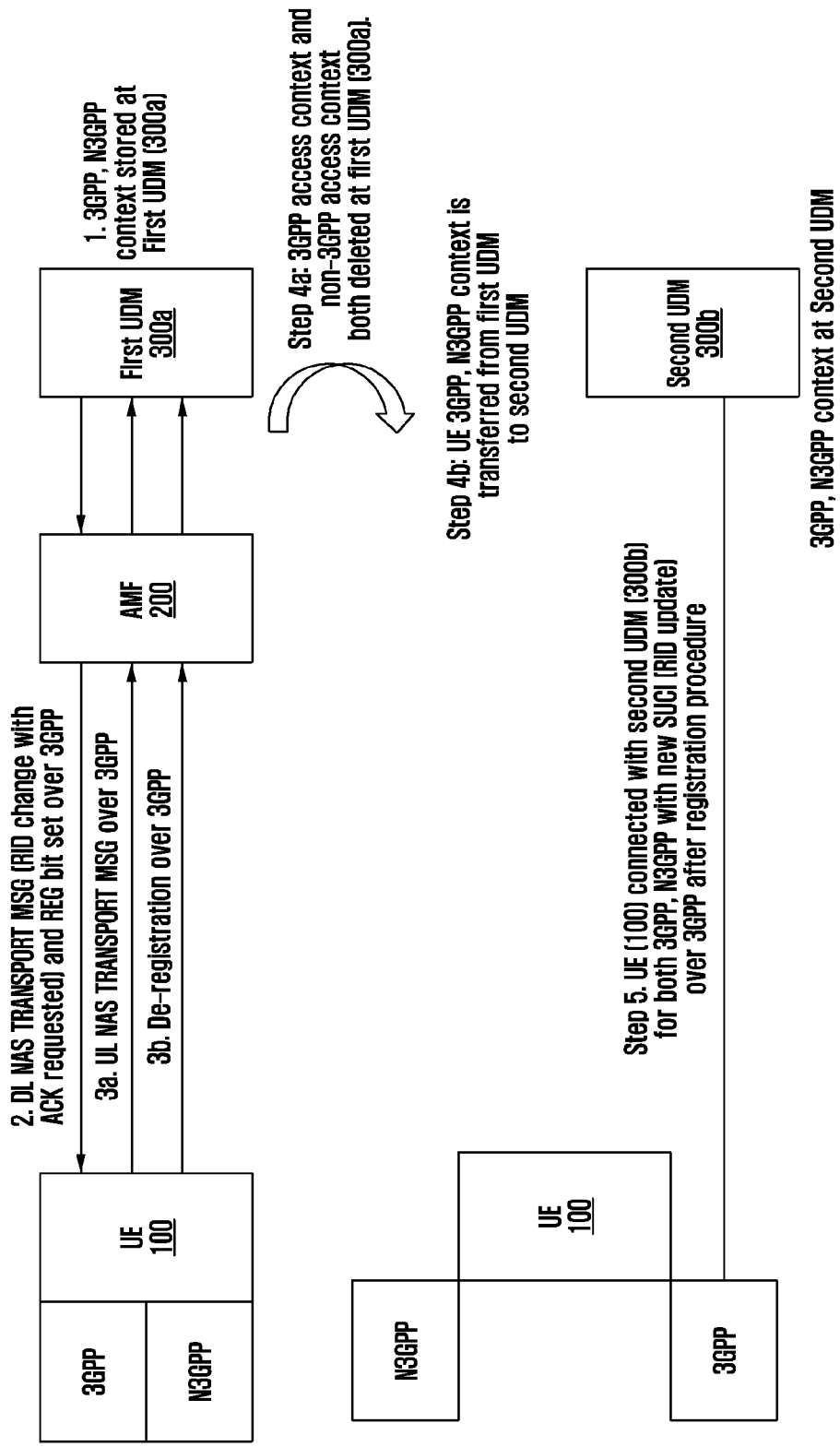
FIG. 3B illustrates a scenario of the routing ID update to switch from the first UDM (300a) to the second UDM (300b) by the UE (100) in the wireless communication network, according to an embodiment as disclosed herein.

FIG. 3B illustrates a scenario of the routing ID update to switch from the first UDM (300*a*) to the second UDM (300*b*) by the UE (100) in the wireless communication network, according to an embodiment as disclosed herein.

Referring to FIG. 3B, in conjunction to FIG. 3A, the steps 1 to 3*a* in FIG. 3A is substantially the same as the steps 1 to 3*a* in FIG. 3B, and hence repeated description has been omitted.

At step 4, the first UDM (300*a*) deletes both the UE context associated with the 3GPP access and the UE context associated with the non-3GPP access, and transfers the same to the second UDM (300*b*).

At step 5, the UE (100) registers with the second UDM (300*b*) and is connected with the second UDM (300*b*) for both the 3GPP access and the N3GPP access with the new SUCI (RID update) over the 3GPP access after the registration procedure.

Further, the UE (100) before de-registering from the N3GPP access determines whether any critical service is active on the non-3GPP access. In response to determining that the critical service is active on the non-3GPP access, the UE (100) waits for the completion of the critical service over the non-3GPP access and then releases the non-access stratum (NAS) signaling connection with the first UDM (300*a*) over the non-3GPP access. Further, the UE (100) enables the IDLE mode over the non-3GPP access, de-registers from the first UDM (300a) over the non-3GPP access and then registers to the second UDM (300b) over the non-3GPP access. In response to determining that the critical service is inactive on the non-3GPP access, the UE (100) releases the NAS signaling connection with the first UDM (300a) over the non-3GPP access and enables the IDLE mode over the non-3GPP access. Further, the UE (100) de-registers from the first UDM (300a) over the non-3GPP access and registers to the second UDM (300b) over the non-3GPP access.

Therefore, unlike to the conventional RID update, the proposed method considers the on-going critical services at the UE (100) before de-registering from the first UDM (300a).

Also, the proposed method transfers the UE context associated with the 3GPP access and the UE context associated with the N3GPP access to the second UDM (300b) from the first UDM (300a). Therefore, the proposed method does not provide the fragmented storing of UE context which leads to context mismatch in the UE (100).

In another embodiment, the UE (100) performs deregistration for both the 3GPP access and the N3GPP access after entering a 3GPP IDLE and when there is no data activity over the N3GPP access (though the N3GPPA is not in IDLE mode).

In yet another embodiment, the UE (100) performs deregistration for both the 3GPP access and the N3GPP access after both the 3GPP access and the N3GPP access enter the IDLE state so that no data activity is interrupted. In yet another embodiment, the UE (100) performs deregistration followed by registration for both the 3GPP access and the N3GPP access after entering the 3GPP IDLE irrespective of the state of the N3GPP access.

In yet another embodiment, the UE (100) aborts the NAS signaling connection on both the 3GPP access and the N3GPP access immediately or at least on one of the access when the alternate access enters IDLE state, perform deregistration followed by registration for both the 3GPP access and the N3GPP access i.e., decide to abort one or both accesses N1 signaling connection to get into IDLE mode and initiate the initial registration procedure or wait for specific important ongoing service to complete then abort one or both accesses N1 signaling connection to get into IDLE mode before initiating initial registration procedure.

The proposed methods are applicable in both the access, i.e., in case the RID change happens over the 3GPP then the N3GPP has to be updated and in case the RID change happens over the N3GPP then the 3GPP access has to be updated. The proposed methods are applicable even in INACTIVE state i.e., wherever IDLE state is specified, can be replaced with INACTIVE state. The deregistration procedure in the proposed methods can be achieved using a single message per access or for both the accesses together.

Figure 4A:
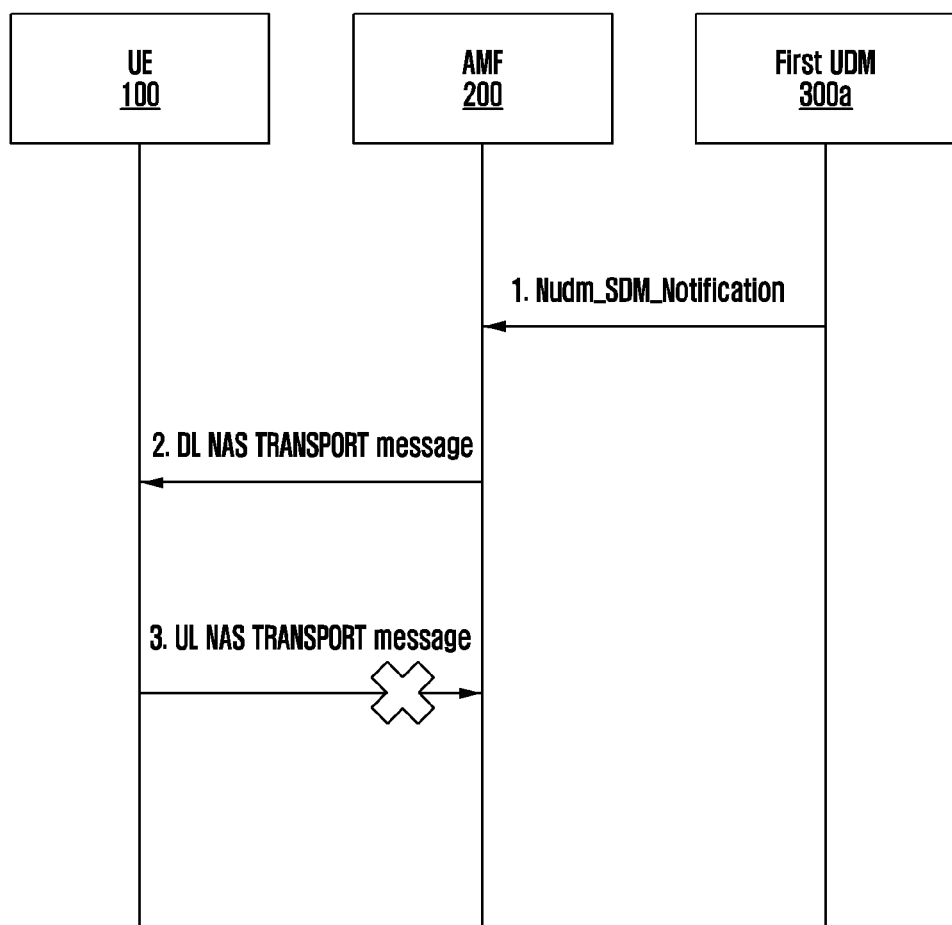
FIG. 4A illustrates a scenario of the UE (100) not sending an acknowledgement in a UL NAS transport message leading to a mismatch in a UE configuration between the UE (100) and the wireless communication network, according to the prior art.

FIG. 4A illustrates a scenario of the UE (100) not sending the acknowledgement in the UL NAS transport message leading to mismatch in the UE configuration between the UE (100) and the wireless communication network, according to the prior art.

In general, there are two types of NAS transport procedures defined in 3GPP 5G NAS specs (24.501) for the purpose of transporting message payload and associated information between the UE (100) and the wireless network. The two NAS transport procedures are UE initiated NAS Transport (UL NAS Transport) procedure and the wireless network initiated NAS Transport (DL NAS Transport) procedure are "independent" procedures. Current 3GPP agreement assumes that the UE-initiated NAS Transport procedure is re-tried by upper layers (above NAS layer) in cases like SMS, etc. But there are cases like the UE (100) receives the SOR information with acknowledgement requested, then the UE Parameters Update via the UDM Control plane (for parameters such as the Routing ID, Slice information, etc.) with acknowledgement requested, etc. where retries might not be attempted in case the procedure fails.

Referring to FIG. 4A, in the conventional methods and systems the UE (100) does not send the acknowledgement for the UL NAS transport message which may cause mismatch in the configurations between the UE (100) and the wireless network or synchronization issue between the UE (100) and the wireless network leading to abnormal behaviors of both the UE (100) and the wireless network which needs to be resolved. Further, various example scenarios are explained below which reflect the mismatch in the configurations between the UE (100) and the wireless network.

Consider an example of the UE parameter update procedure i.e., the first UDM (300a) updates the new RID received in the DL NAS transport message via the AMF (200) with acknowledgement requested indication. After verifying the message from the wireless network, the UE (100) updates the new RID, generates new subscription concealed identifier (SUCI) and initiates the UL NAS transport message to send the acknowledgement to the wireless network. However, the failure in the transmission of the UL NAS transport message will lead to mismatch in the configurations between the UE (100) and the wireless network.

Consider another example of a radio link failure (RLF) no service due to which the UL NAS transport procedure is aborted and the recovery procedures are performed. After the recovery of the service, the UE (100) never sends the acknowledgement in the UL NAS transport message as there is no method defined to send the acknowledgement again because the current state machine does not support the aborted procedure. Therefore, a mismatch is created with respect to the UE configuration between the UE (100) and the wireless network.

In yet another example case of cell change belonging to different tracking area identifier (TAI) due to a change of the cell belonging to a different registration area/tracking area, the UE (100) aborts the UL NAS transport procedure and initiates a mobility registration update procedure. After completion of the registration update procedure, there is no method defined for the UE (100) to re-initiate the aborted procedure leading to the mismatch of the UE configuration between the UE (100) and the wireless network.

In yet another example case of (re-) transmission failure of the UL NAS transport message, the UE (100) sends the UL NAS Transport message but there is no L2 acknowledgement received. The UE (100) deems the procedure as failure and continue to use the old RID while the wireless network maintains the new RID by deleting the old RID as the NAS Transport procedures are independent procedures or the UE (100) starts using the new RID while the wireless network deems the procedure as failure as acknowledgement has not been received maintaining the old RID for the UE (100); leading to mismatch in the UE configuration between the UE (100) and the wireless network.

In all above example cases, the RID ambiguity between the UE (100) and the wireless network leads to unexpected behavior and mismatch in the configurations between the UE (100) and the wireless network, impacting the subsequent procedures like authentication.

Figure 4B:
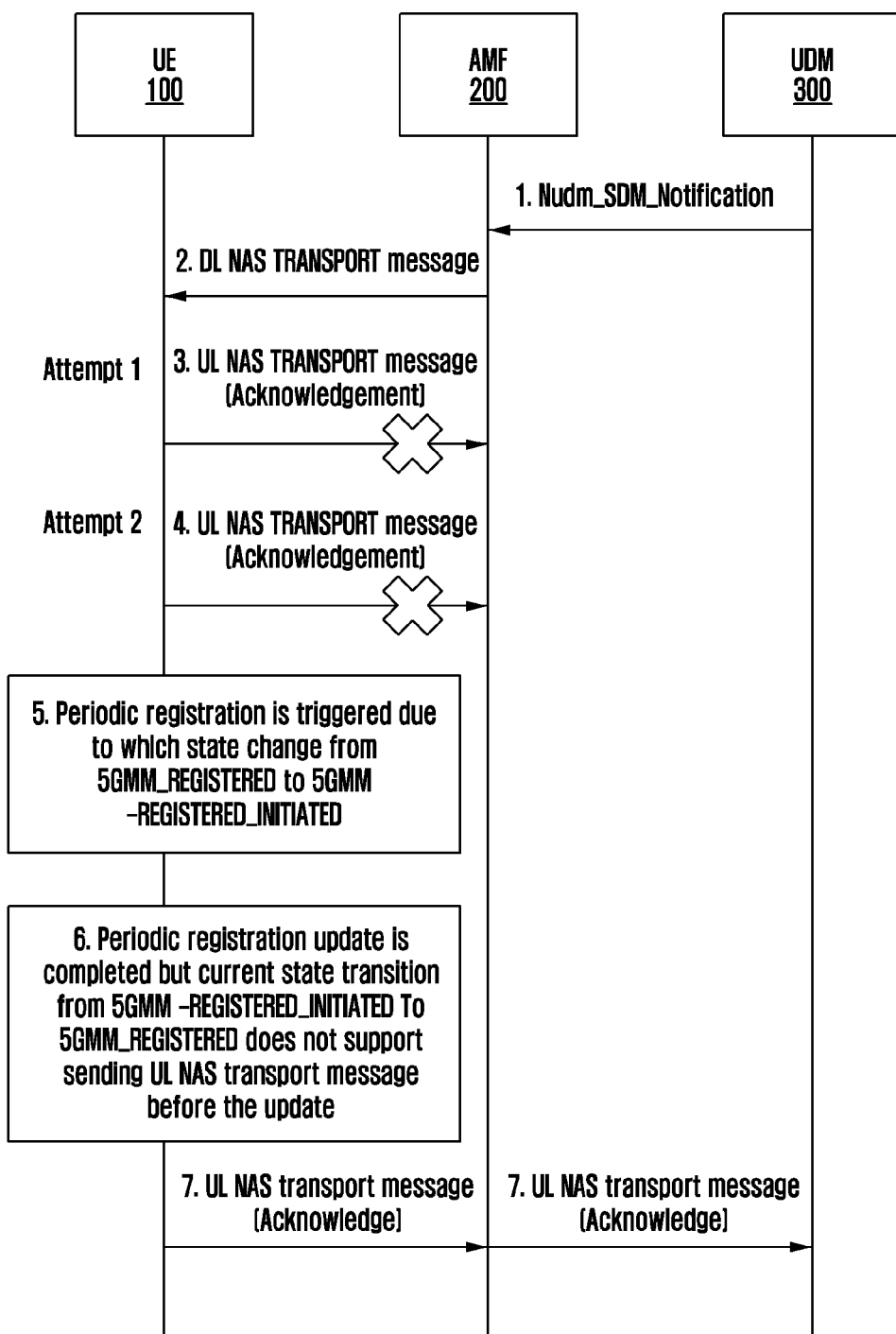
FIG. 4B illustrates various scenarios of the UE (100) re-running an ongoing procedure that triggers a UE-initiated NAS transport procedure, according to the embodiments as disclosed herein.

FIG. 4B illustrates various scenarios of the UE (100) re-running the ongoing procedure that triggers the UE-initiated NAS transport procedure, according to the embodiments as disclosed herein.

In the proposed method, the UE (100) is configured to handle the attempts for the UE-initiated NAS procedure (UL NAS Transport Message) depending on whether the upper layer (above NAS) retries is possible or not i.e., based on the UE implementation. Further, the method is also applicable in example cases like transmission failure of the UE-initiated NAS transport message with the TAI change or no TAI change indication received from the lower layers accordingly where (re-) transmissions attempt may not happen (i.e., without the proposed changes the UE (100) will not re-try the transmission of the UL NAS Transport Message in the described scenarios). The abnormal cases in the UE (100) are transmission failure of the UL NAS transport message with the TAI change from the lower layers. If the current TAI is not in the TAI list, the UE-initiated NAS transport procedure maybe aborted and a registration procedure for mobility and periodic registration update maybe initiated. The UL NAS transport message can be sent, if still necessary, after a successful procedure for mobility and periodic registration update. If the current TAI is still part of the TAI list, the UE (100) based on UE implementation decides the method to re-run the ongoing procedure that triggered the UE-initiated NAS transport procedure. Another example of the abnormal cases in the UE (100) is the transmission failure of the UL NAS transport message indication without the TAI change from the lower layers where the UE (100) based on UE implementation decides the method to re-run the ongoing procedure that triggered the UE-initiated NAS transport procedure.

A plurality of the UE specific implementation methods are proposed to handle the ambiguity caused due to the UL NAS transport procedure in abnormal scenarios where the upper layers cannot control the re-initiation of UL NAS transport procedure (SoR, UDM Parameter update procedure etc.).

In a first UE specific implementation method, when the UE (100) has to trigger or transmit the UL NAS Transport message the UE (100) needs to define and maintain a state or sub-state based on the implementation, (example UL_NAS_TRANS_ATTEMPTING) indicating that UE-initiated NAS transport procedure is triggered and waiting for the confirmation (L2 ACK) of the successful transmission or any response of the message based on the scenario which triggered the same. Further, after receiving the confirmation of successful transmission of the message the UE (100) is configured to change the sub-state back to the initial state (example: UL_NAS_TRANS_INIT) indicating that the UL NAS transport message is not pending or the procedure is successful and hence back to the initial state. If there is no L2 acknowledgement from the wireless network for the UL NAS transport message, then the procedure is deemed as failure and re-attempted maintaining the current state until the maximum number of attempts (controlled by attempt counter) is exhausted. If the maximum number of re-transmission attempts fail, then the procedure is declared as failed and the proceeding is aborted as per the current standards and state is changed back to the initial state (example UL_NAS_TRANS_INIT).

For example, consider that a periodic registration timer expires during the on-going UL NAS Transport procedure, then the UE-initiated NAS transport procedure is aborted and the registration update procedure is performed. Further, the UE (100) maintains the internal state/sub-state for the aborted UL NAS Transport procedure and re-attempt the procedure after registration update is successful.

Referring to FIG. 4B, a similar case of the UE (100) triggering the transmission of the UL NAS transport message is provided. At step 3 and step 4, when the UE (100) attempts to send the UL NAS transport message (acknowledgement), the UL NAS transport procedure fails. At step 5, the UE (100) triggers a periodic registration due to which the state changes from a 5GMM_REGISTERED state to a 5GMM-REGISTERED_INITIATED state. Further, at step 6, the periodic registration update is completed but current state transition from the 5GMM-REGISTERED_INITIATED to the 5GMM_REGISTERED does not support sending the UL NAS transport message before the update. Therefore, once the update is completed, at step 7, the UL NAS transport message (acknowledgement) is retransmitted by the UE (100).

In any similar scenario, the state/sub-state check maybe performed after the 3GPP defined procedures have been completed.

A second UE specific implementation method to handle the UE-initiated NAS transport procedure includes maintaining a global variable (s) at the UE (100). The global variable (s) is set (example: ul_nas_trans_triggered=0/1-0 no procedure, 1-procedure is triggered) to 1 when the procedure is initiated by the UE (100) and the global variable (s) is not changed until the confirmation of the successful transmission or any response for the message is received depending on the scenario that triggered the UE-initiated NAS transport procedure. Further, after receiving the confirmation of successful transmission of the message the UE (100) sets the global variable to 0 indicating that no procedure is triggered or the procedure is successful and back to the initial state. Further, the UE (100) handles the different possible scenarios mentioned as per the first UE specific implementation method, with the second UE specific implementation method by retaining the value set in the global variable and changing the value of the global variable to 0 or the initial state only when the procedure is declared successful or failure.

A third UE specific implementation method to handle the UE-initiated NAS transport procedure includes maintaining a NV/EFS item at the UE (100). The third UE specific implementation method is similar to the second UE specific implementation method except that instead of maintaining the global variable the UE (100) maintains one of the NV item, the EFS item or something relative to perform the same actions as proposed in the various UE specific implementation methods for the abnormal scenario handling of the UE-initiated NAS transport procedure. The proposed method is also applicable when the UE (100) is switched off or reboots due to any reason during the transmission of the UL NAS transport message. Consider that the UE (100) is switched off or restart option is chosen, then the NV item indicating the abortion of the on-going UE-initiated NAS transport procedure is stored along with the payload. As the UE (100) is powered on immediately and/or after a T time (optionally based on implementation) and is registered with the wireless network, the UE (100) attempts to re-transmit the aborted UL NAS transport procedure. If the timer T expires before the UE (100) is able to register to the network, then the NV/EFS item is discarded and the payload performing no further action related to this optionally. Further, if the re-transmission fails exhausting the maximum attempts, then the procedure is declared as failed and the procedure is aborted as per the current standards and any stored NV/EFS item and the payload are discarded.

Figure 5A:
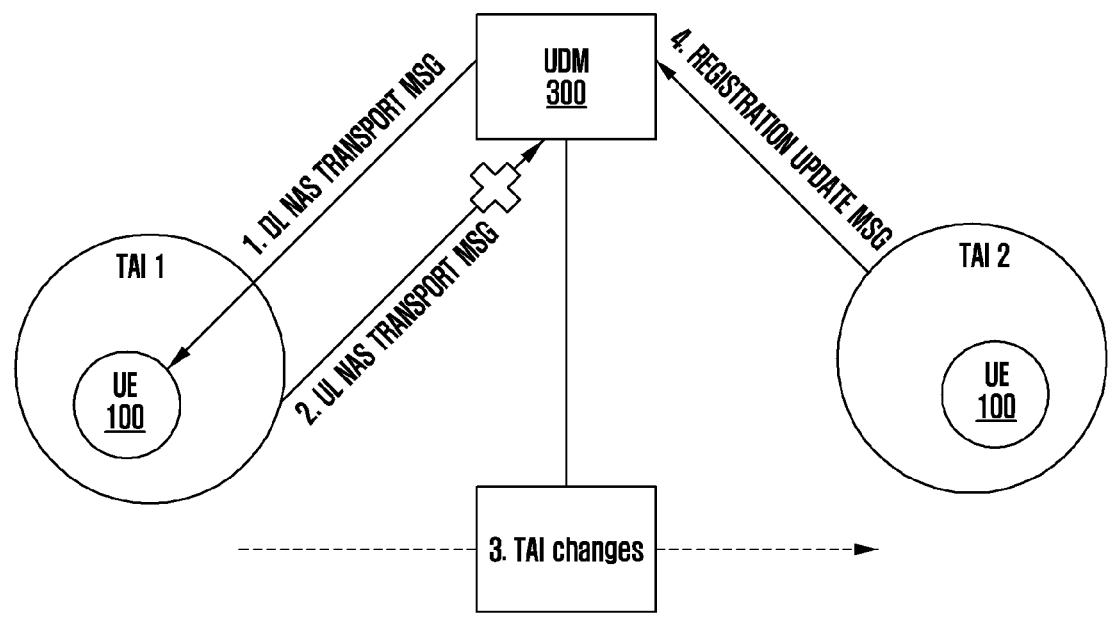
FIG. 5A illustrates a scenario of the UE (100) not re-initiating an aborted UL NAS transport procedure after completion of a registration update procedure in the wireless communication network, according to the prior art.

FIG. 5A illustrates a scenario of the UE (100) not re-initiating the aborted UL NAS transport procedure after completion of a registration update procedure in the wireless network, according to the prior art.

Referring to FIG. 5A, at step 1, consider that the UE (100) is registered in a registration are represented by a tracking area identity 1 (TAI 1) and the UDM (300) sends the DL NAS transport message with acknowledgement requested. At step 2, in response to the DL NAS transport message sent by the UDM (300), the UE (100) transmits the UL NAS transport message to the UDM (300). However, at step 3, due to the mobility of the UE (100), the TAI changes from the TAI 1 to the TAI 2. Due to the TAI change, the UE (100) aborts the on-going UL NAS transport message and performs the registration update procedure by sending the registration update message, as shown in step 4. However, there is existing method defined to re-initiate the aborted UL NAS transport procedure during the state machine changes because of procedure which leads to synchronization issues.

Figure 5B:
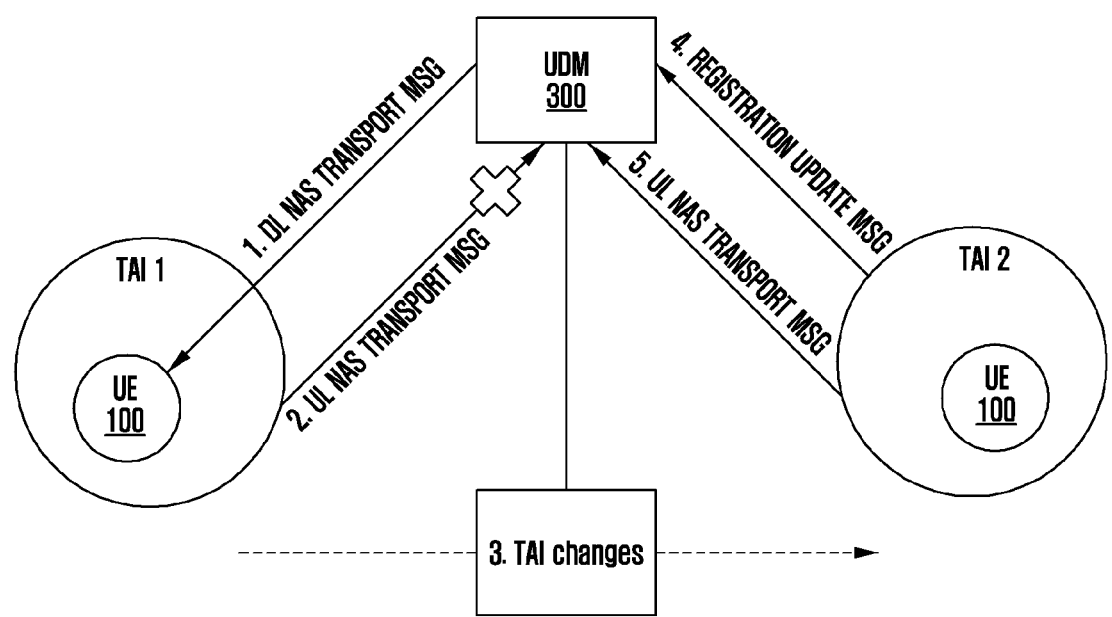
FIG. 5B illustrates a scenario of the UE (100) re-initiating the aborted UL NAS transport procedure after completion of the registration update procedure in the wireless communication network, according to the embodiments as disclosed herein.

FIG. 5B illustrates a scenario of the UE (100) re-initiating the aborted UL NAS transport procedure after completion of the registration update procedure in the wireless network, according to the embodiments as disclosed herein.

Referring to FIG. 5B, at step 1, the UE (100) registered in the TAI 1 receives the DL NAS transport message with acknowledgement requested from the UDM (300). At step 2, in response to the DL NAS transport message sent by the UDM (300), the UE (100) transmits the UL NAS transport message to the UDM (300). However, at step 3, due to the mobility of the UE (100), the TAI changes from the TAI 1 to the TAI 2. Due to the TAI change, the UE (100) aborts the on-going UL NAS transport message and performs the registration update procedure by sending the registration update message, as shown in step 4. At step 5, the UE (100) re-initiates the aborted UL NAS transport procedure by sending the UL NAS transport message to the UDM (300) after the registration update procedure is completed from the TAI 2 location.

Figure 6A:
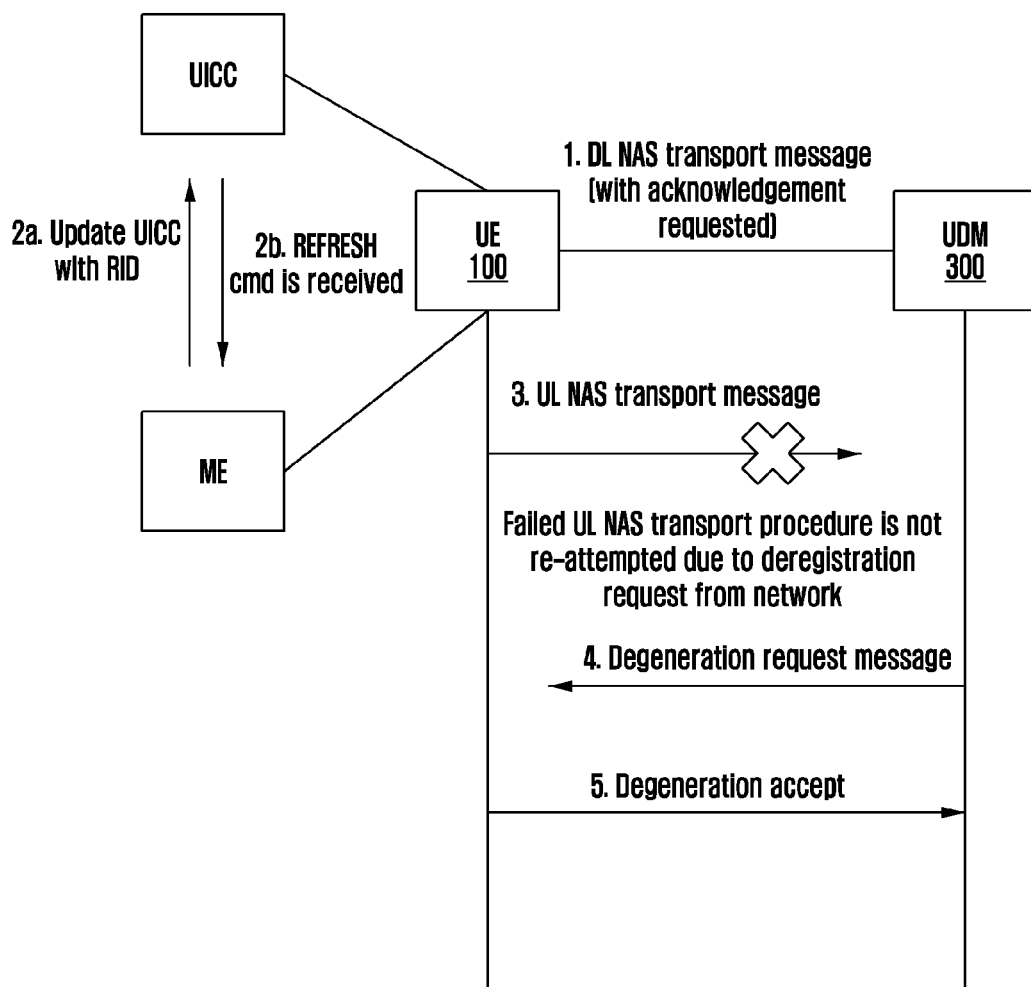
FIG. 6A illustrates a scenario of the UE (100) not re-initiating the aborted UL NAS transport procedure due to processing of a deregistration procedure triggered by the wireless communication network, according to the prior art.

FIG. 6A illustrates a scenario of the UE (100) not re-initiating the aborted UL NAS transport procedure due to processing of a deregistration procedure triggered by the wireless network, according to the prior art.

Referring to FIG. 6A, consider that the UDM (300) of the wireless network sends the DL NAS transport message with acknowledgement requested to the UE (100). At step 2a, the UE (100) sends the DL NAS transport message to the universal integrated circuit card (UICC) present in the UE (100) to update the UICC with the RID. At step 2b, the UICC refresh command is received in response.

At step 3, the UE (100) initiates the UL NAS transport message and fails. However the re-attempt to transmit the UL NAS transport message is not possible as the wireless network sends a deregistration request to the UE (100). At step 4, the UE (100) receives the deregistration request message from the UDM (300). Due to the deregistration request message, the UL NAS transport procedure is aborted and the deregistration procedure is processed. During the UE parameter update via the UDM control plane procedure the routing ID (RID) can be updated with acknowledgement requested using 3GPP defined NAS transport procedure.

However, there is a scenario where the UL NAS transport procedure is aborted or failed and also another scenario of the collision with deregistration that may occur. In the collision with deregistration scenario the UE (100) triggers the UL NAS transport message and fails. Simultaneously, the UDM (300) of the wireless network sends the deregistration request message or deregistration is triggered from the upper layers causing a collision between the two procedures. The UL NAS transport procedure is aborted (and stopping any further re-attempts for the UL NAS transport procedure) and the deregistration procedure is processed first as per the current standard agreement. However, due to the abortion of the UL NAS transport procedure, a mismatch is caused in the configurations between the UE (100) and the wireless network or sync issue between the UE (100) and the wireless network, leading to abnormal behaviors of both the UE (100) and the wireless network.

Figure 6B:
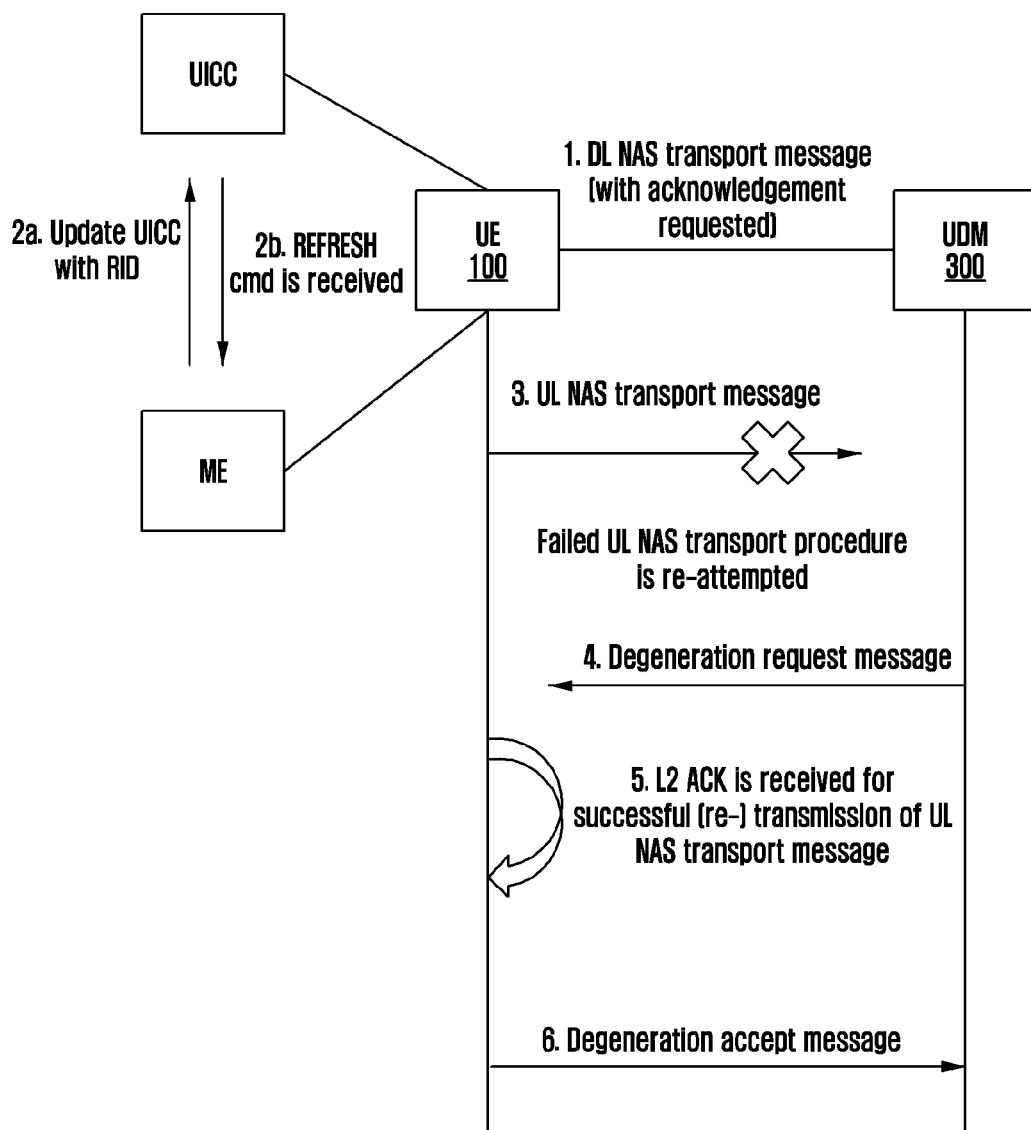
FIG. 6B illustrates a scenario of the UE (100) re-initiating the aborted UL NAS transport procedure and then processing the deregistration procedure triggered by the wireless communication network, according to the embodiments as disclosed herein.

FIG. 6B illustrates a scenario of the UE (100) re-initiating the aborted UL NAS transport procedure and then processing the deregistration procedure triggered by the wireless network, according to the embodiments as disclosed herein.

Referring to FIG. 6B, in conjunction with FIG. 6A, the issues caused due to the collision between the deregistration procedure triggered by the wireless network and re-attempting of the aborted UL NAS transport procedure is proposed. Further, the steps 1 to 2b in the FIG. 6B, may be substantially the same as the steps 1 to 2b in FIG. 6A, and thus repeated description is omitted.

In the proposed method, at step 3, the UE (100) does not send the acknowledgment message to the wireless network until the UICC sends the REFRESH command. Further, the UE (100) initiates the UL NAS transport message but fails and prepares for the re-attempt. However, in the mean time at step 4, the wireless network sends the deregistration request message to the UE (100). Though the UE (100) receives the deregistration request, the UE (100) completes the UL NAS transport procedure which is confirmed when the L2 ACK message is received for the successful (re-) transmission of the UL NAS transport message, sent in step 5. Further, at step 6, the UE (100) processes the deregistration procedure. Therefore, unlike to the conventional methods and systems, in the proposed method when there is a collision between the UE's UL NAS transport message (example due to failure during the first attempt) and the deregistration request message from the wireless network, the UE (100) continues with the on-going UL NAS Transport procedure and then process the deregistration request from the wireless network. If at step 2b, the UICC does not send the REFRESH command then the ME may either store the UL NAS transport message or send the UL NAS transport message after the REFRESH message is received until the UE (100) is powered off or discard the UL NAS transport message restoring the previous configuration post the UE (100) is powered off.

Figure 7A:
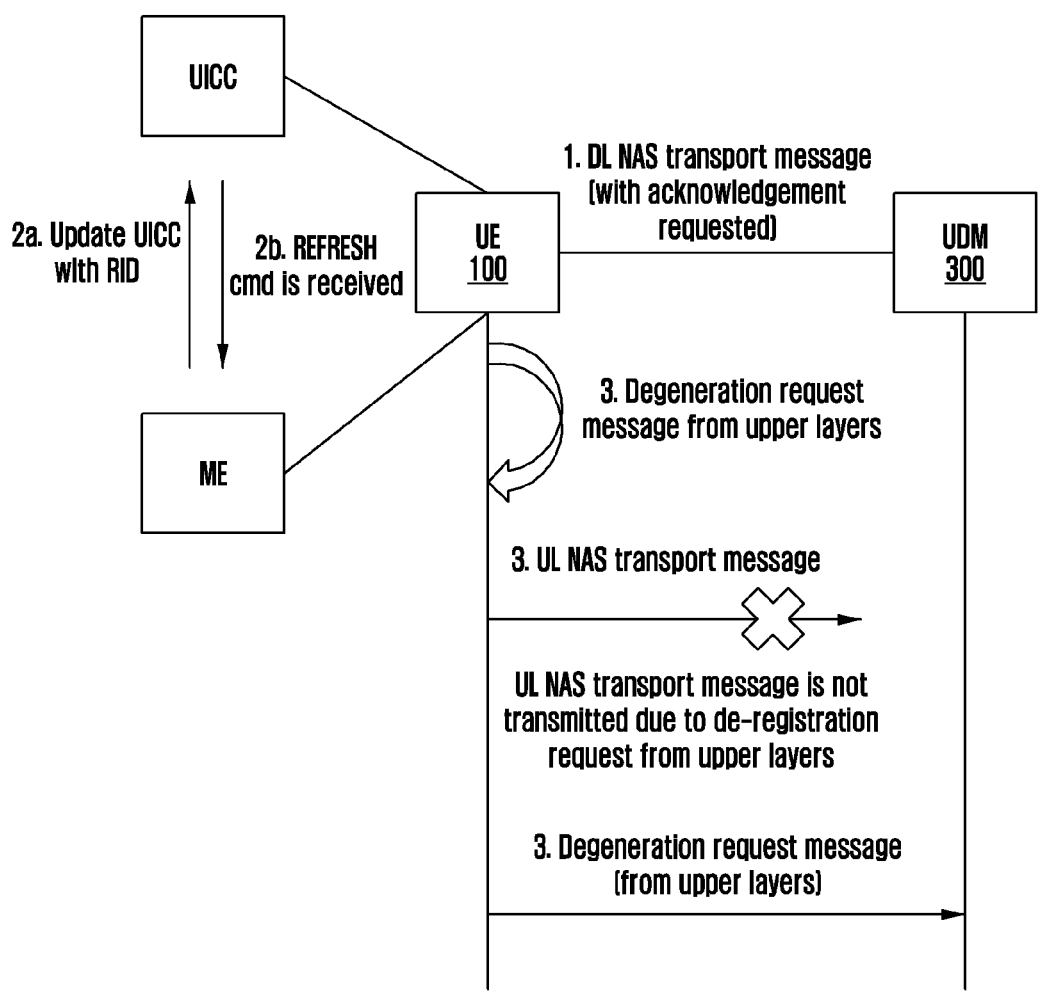
FIG. 7A illustrates a scenario of the UE (100) not re-initiating the aborted UL NAS transport procedure due to processing of the deregistration procedure triggered by the upper layers, according to the prior art.

FIG. 7A illustrates a scenario of the UE (100) not re-initiating the aborted UL NAS transport procedure due to processing of the deregistration procedure triggered by the upper layers, according to the prior art.

Referring to FIG. 7A, at step 1, consider that the UDM (300) of the wireless network sends the DL NAS transport message with acknowledgement requested to the UE (100). At step 2a, the UE (100) sends the DL NAS transport message to the universal integrated circuit card (UICC) present in the UE (100) to update the UICC with the RID. At step 2b, the UICC refresh command is received in response by the UE (100) and the UE (100) wants to send the UL NAS transport message. However, at the same time, at step 3, the upper layers initiate the deregistration request message. Since, the upper layers initiates the deregistration procedure, the UL NAS transport procedure is not initiated by the UE (100) and the deregistration procedure is processed.

Figure 7B:
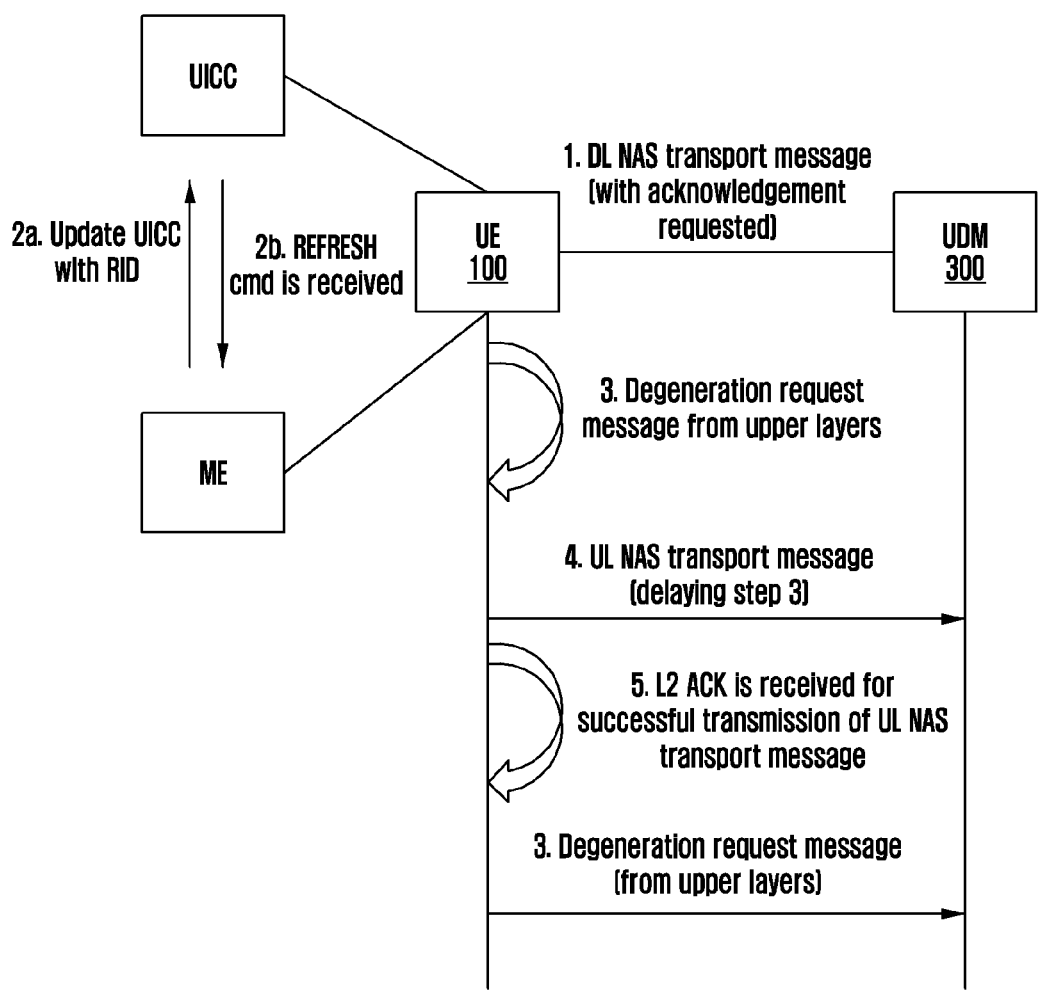
FIG. 7B illustrates a scenario of the UE (100) re-initiating the aborted UL NAS transport procedure and later processing the deregistration procedure triggered by the upper layers, according to the embodiments as disclosed herein.

FIG. 7B illustrates a scenario of the UE (100) re-initiating the aborted UL NAS transport procedure and later processing the deregistration procedure triggered by the upper layers, according to the embodiments as disclosed herein.

Referring to FIG. 7B, in conjunction with FIG. 7A the issues caused due to the collision between the deregistration procedure triggered by the upper layers and the UL NAS transport procedure is proposed. Further, the steps 1 to 3 in FIG. 7B, may be substantially the same as the steps 1 to 3 in FIG. 7A, and thus repeated description is omitted. In the proposed method, the UE (100) does not send the acknowledgment message to the wireless network until the UICC sends the REFRESH command.

At step 3, when the UE (100) receives the deregistration request, the UE (100) also receives the UICC refresh command based on which the UE (100) would initiate the UL NAS transport message. At step 4, the UE (100) sends the UL NAS transport message to the wireless network and delays processing the deregistration request message sent by the upper layers. Further, at step 5, the UE (100) receives the L2 ACK for successful transmission of the UL NAS transport message. After receiving the L2 ACK, the UE (100) processes the deregistration request received from the upper layers. Unlike to the conventional methods and systems, in the proposed method, when there is a collision between the UL NAS transport message and the deregistration request message from the upper layers, the UE (100) continues with the on-going UL NAS transport procedure and delays the processing of the deregistration request from the upper layers until the UL NAS transport procedure is concluded. After the completion of the UL NAS transport procedure, the UE (100) sends the deregistration message to the wireless network. Hence, the proposed method tackles the issue of collision between the deregistration procedure triggered by the upper layers and the on-going UL NAS transport procedure.

The embodiments disclosed herein can be implemented through at least one software program running on at least one hardware device and performing network management functions to control the elements. The elements shown in FIG. 1-7B include blocks which can be at least one of a hardware device, or a combination of hardware device and software module.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:
   receiving information including updated routing ID and an indication to initiate a registration procedure,
   determining that the UE is registered over a non-3rd generation partnership project (non-3GPP) access and the UE does not have an emergency service ongoing over the non-3GPP access;
   releasing a non-access stratum (NAS) signaling connection locally over the non-3GPP access and entering an IDLE mode over the non-3GPP access;
   performing a de-registration procedure over the non-3GPP access; and
   initiating a registration procedure for initial registration based on the updated routing ID.

2. The method of claim 1, in case that the UE is registered over the non-3GPP access and has an emergency service ongoing over the non-3GPP access, the method further comprising:
   waiting until the emergency service is completed;
   releasing the NAS signaling connection locally and entering the IDLE mode over the non-3GPP access, after waiting the emergency service is completed;
   performing the de-registration procedure over the non-3GPP access; and
   initiating the registration procedure for initial registration over the non-3GPP access.

3. The method of claim 1, wherein, in case that the UE is registered over a 3GPP access, the method further comprising:
   waiting until the UE enters the IDLE mode over the 3GPP access;
   performing the de-registration procedure over the 3GPP access; and
   initiating the registration procedure for initial registration over the 3GPP access.

4. The method of claim 1, wherein the information is received in a downlink Non-Access Stratum (DL NAS) transport message.

5. The method of claim 1, further comprising deleting a 5G-globally unique temporary identifier (5G-GUTI) in case that the UE is registered to a different public land mobile network (PLMN) on a 3GPP access, before initiating the registration procedure for initial registration.

6. A user equipment (UE) in a communication system, the UE comprising:
   a transceiver; and
   at least one processor configured to:
      receive information including updated routing ID and an indication to initiate a registration procedure,
      determine that the UE is registered over a non-3rd generation partnership project (non-3GPP) access and the UE does not have an emergency service ongoing over the non-3GPP access,
      release a non-access stratum (NAS) signaling connection locally over the non-3GPP access and enter an IDLE mode over the non-3GPP access,
      perform a de-registration procedure over the non-3GPP access, and
      initiate a registration procedure for initial registration based on the updated routing ID.

7. The UE of claim 6, wherein, in case that the UE is registered over the non-3GPP access and has an emergency service ongoing over the non-3GPP access, the at least one processor is further configured to:
   wait until the emergency service is completed;
   release the NAS signaling connection locally and enter the IDLE mode over the non-3GPP access, after waiting the emergency service is completed;
   perform the de-registration procedure over the non-3GPP access; and
   initiate the registration procedure for initial registration over the non-3GPP access.

8. The UE of claim 6, wherein, in case that the UE is registered over a 3GPP access, the at least one processor is further configured to:
   wait until the UE enters the IDLE mode over the 3GPP access;
   perform the de-registration procedure over the 3GPP access; and
   initiate the registration procedure for initial registration over the 3GPP access.

9. The UE of claim 6, wherein the information is received in a downlink Non-Access Stratum (DL NAS) transport message.

10. The UE of claim 6, the at least one processor is further configured to delete a 5G-globally unique temporary identifier (5G-GUTI) in case that the UE is registered to a different public land mobile network (PLMN) on a 3GPP access, before initiating the registration procedure for initial registration.

* * * * *